(12) United States Patent
Feng et al.

(10) Patent No.: US 12,117,598 B2
(45) Date of Patent: Oct. 15, 2024

(54) VARIABLE FOCUSING LENS APPARATUS

(71) Applicant: Hand Held Products, Inc., Charlotte, NC (US)

(72) Inventors: Chen Feng, Mt Laurel, NJ (US); Tao Xian, Columbus, NJ (US); Eric A. Youngblood, Matthews, NC (US)

(73) Assignee: Hand Held Products, Inc., Charlotte, NC (US)

( * ) Notice: Subject to any disclaimer, the term of this patent is extended or adjusted under 35 U.S.C. 154(b) by 135 days.

(21) Appl. No.: 17/654,502

(22) Filed: Mar. 11, 2022

(65) Prior Publication Data

US 2023/0288684 A1     Sep. 14, 2023

(51) Int. Cl.
| | |
|---|---|
| *G02B 15/14* | (2006.01) |
| *G02B 7/00* | (2021.01) |
| *G02B 15/15* | (2006.01) |
| *G03B 17/12* | (2021.01) |

(52) U.S. Cl.
CPC ............. *G02B 15/15* (2013.01); *G02B 7/004* (2013.01); *G03B 17/12* (2013.01)

(58) Field of Classification Search
CPC ......... G02B 15/14; G02B 7/04; G02B 13/009
See application file for complete search history.

(56) References Cited

U.S. PATENT DOCUMENTS

| | | |
|---|---|---|
| 5,289,442 A | 2/1994 | Van Rosmalen |
| 5,499,143 A | 3/1996 | Sakamoto et al. |
| 8,711,496 B2 | 4/2014 | Wu |
| 9,134,503 B2 | 9/2015 | Topliss |
| 10,036,896 B2 | 7/2018 | Hee et al. |
| 10,656,373 B1 | 5/2020 | Bardagjy |
| 2005/0264901 A1 | 12/2005 | Honsho |
| 2006/0214520 A1 | 9/2006 | Tseng |

(Continued)

FOREIGN PATENT DOCUMENTS

| | | |
|---|---|---|
| CN | 101023386 A | 8/2007 |
| CN | 101443686 A | 5/2009 |

(Continued)

OTHER PUBLICATIONS

Intention to grant Mailed on Oct. 11, 2023 for EP Application No. 21154455, 9 page(s).

(Continued)

*Primary Examiner* — Joseph P Martinez
(74) *Attorney, Agent, or Firm* — Alston & Bird LLP

(57) ABSTRACT

An example variable focusing lens apparatus, as well as example methods for assembling and operating the example variable focusing lens apparatus, is provided. The example variable focusing lens apparatus includes a rear pair of coil elements powered by a rear coil current, a front pair of coil elements positioned in front of the rear pair of coil elements and powered by a front coil current, and a barrel lens assembly comprising a top magnetic element secured on a top portion of the barrel lens assembly and a bottom magnetic element secured on a bottom portion of the barrel lens assembly. In some examples, the barrel lens assembly is moveable to a plurality of barrel lens assembly positions corresponding to a plurality of current differential ratios associated with the rear coil current and the front coil current.

20 Claims, 18 Drawing Sheets

(56) References Cited

U.S. PATENT DOCUMENTS

| | | |
|---|---|---|
| 2007/0035628 A1 | 2/2007 | Kanai |
| 2007/0047942 A1 | 3/2007 | Chang et al. |
| 2007/0127325 A1 | 6/2007 | Yamashita |
| 2007/0217043 A1 | 9/2007 | Cho et al. |
| 2008/0225410 A1 | 9/2008 | Ning et al. |
| 2008/0266684 A1* | 10/2008 | Chang ............... G02B 7/08 |
| | | 359/827 |
| 2010/0046085 A1 | 2/2010 | Yumiki et al. |
| 2010/0053768 A1 | 3/2010 | Yumiki et al. |
| 2010/0060995 A1 | 3/2010 | Yumiki et al. |
| 2010/0237718 A1 | 9/2010 | Tsai et al. |
| 2010/0246035 A1 | 9/2010 | Yamashita et al. |
| 2011/0103789 A1 | 5/2011 | Honjo et al. |
| 2011/0116176 A1 | 5/2011 | Yumiki et al. |
| 2011/0164154 A1 | 7/2011 | Honjo et al. |
| 2011/0235187 A1 | 9/2011 | Yumiki et al. |
| 2011/0242404 A1 | 10/2011 | Yumiki et al. |
| 2011/0242405 A1 | 10/2011 | Yumiki et al. |
| 2011/0242406 A1 | 10/2011 | Yumiki et al. |
| 2011/0242681 A1 | 10/2011 | Yumiki et al. |
| 2011/0254996 A1 | 10/2011 | Yumiki et al. |
| 2011/0254997 A1 | 10/2011 | Yumiki et al. |
| 2012/0002102 A1 | 1/2012 | Sekimoto |
| 2012/0120511 A1 | 5/2012 | Ku |
| 2012/0182633 A1 | 7/2012 | Kobayashi et al. |
| 2012/0237147 A1 | 9/2012 | Utz |
| 2013/0062414 A1 | 3/2013 | Anselment et al. |
| 2013/0235470 A1 | 9/2013 | Yumiki et al. |
| 2013/0235483 A1 | 9/2013 | Wu |
| 2014/0160535 A1 | 6/2014 | Shen et al. |
| 2015/0110480 A1 | 4/2015 | Suzuka |
| 2015/0110481 A1 | 4/2015 | Suzuka |
| 2015/0110482 A1 | 4/2015 | Suzuka |
| 2015/0296143 A1 | 10/2015 | Kang et al. |
| 2015/0373272 A1 | 12/2015 | Lim et al. |
| 2016/0252702 A1 | 9/2016 | Tsuchiya et al. |
| 2016/0349530 A1 | 12/2016 | Liao |
| 2017/0192195 A1 | 7/2017 | Murakami |
| 2018/0004994 A1 | 1/2018 | Bottazzi et al. |
| 2018/0024329 A1 | 1/2018 | Goldenberg et al. |
| 2018/0031860 A1 | 2/2018 | Bachar et al. |
| 2018/0109660 A1 | 4/2018 | Yoon et al. |
| 2018/0196238 A1 | 7/2018 | Goldenberg et al. |
| 2018/0224631 A1 | 8/2018 | Ichihashi |
| 2018/0224665 A1 | 8/2018 | Im et al. |
| 2018/0364450 A1 | 12/2018 | Lee et al. |
| 2019/0115860 A1 | 4/2019 | Mizukami et al. |
| 2019/0121053 A1 | 4/2019 | Hagiwara |
| 2019/0162934 A1 | 5/2019 | Dong |
| 2019/0196137 A1 | 6/2019 | Ushioda |
| 2019/0265432 A1 | 8/2019 | Kawanabe |
| 2020/0249426 A1 | 8/2020 | Kazuo |
| 2020/0260011 A1 | 8/2020 | Sasaki et al. |
| 2020/0341350 A1 | 10/2020 | Tseng et al. |
| 2021/0063679 A1 | 3/2021 | Park |
| 2021/0231904 A1 | 7/2021 | Son et al. |
| 2021/0239932 A1 | 8/2021 | Feng et al. |
| 2021/0382262 A1* | 12/2021 | Wu ............... G02B 13/009 |
| 2022/0046151 A1 | 2/2022 | Shabtay et al. |

FOREIGN PATENT DOCUMENTS

| | | | |
|---|---|---|---|
| CN | 102906763 | A | 1/2013 |
| CN | 203365879 | U | 12/2013 |
| CN | 108088424 | A | 5/2018 |
| CN | 108345083 | A | 7/2018 |
| CN | 109188641 | A | 1/2019 |
| CN | 110908067 | A | 3/2020 |
| EP | 3862803 | A1 | 8/2021 |
| JP | S59-094709 | A | 5/1984 |
| JP | 05-094629 | A | 4/1993 |
| JP | 2007-074696 | A | 3/2007 |
| JP | 2007-155886 | A | 6/2007 |
| JP | 2010-068635 | A | 3/2010 |
| JP | 2011-039481 | A | 2/2011 |
| JP | 2012-093558 | A | 5/2012 |
| JP | 2012-145837 | A | 8/2012 |
| JP | 2012-189711 | A | 10/2012 |
| JP | 2015-099275 | A | 5/2015 |
| JP | 2015-127724 | A | 7/2015 |
| JP | 3200481 | U | 10/2015 |
| JP | 2016-020939 | A | 2/2016 |
| JP | 2016-028299 | A | 2/2016 |
| JP | 2016-180859 | A | 10/2016 |
| JP | 2018-120072 | A | 8/2018 |
| JP | 2018-128588 | A | 8/2018 |
| JP | 2018-180352 | A | 11/2018 |
| JP | 2019-078850 | A | 5/2019 |
| JP | 2019-101403 | A | 6/2019 |
| WO | 2014/210516 | A2 | 12/2014 |
| WO | 2015/110916 | A1 | 7/2015 |
| WO | 2020/013465 | A1 | 1/2020 |
| WO | 2020/027588 | A1 | 2/2020 |

OTHER PUBLICATIONS

English Translation of JP Office Action dated Nov. 2, 2023 for JP Application No. 2022178791, 4 page(s).
JP Office Action Mailed on Nov. 2, 2023 for JP Application No. 2022178791, 4 page(s).
Notice of Allowance and Fees Due (PTOL-85) Mailed on Sep. 26, 2023 for U.S. Appl. No. 17/157,986, 10 page(s).
CN Office Action Mailed on Sep. 1, 2023 for CN Application No. 202110156292, 8 page(s).
English Translation of JP Office Action dated Jul. 7, 2022 for JP Application No. 2021014562, 3 page(s).
English Translation of JP Office Action dated Jul. 27, 2023 for JP Application No. 2022178791, 3 page(s).
English Translation of JP Office Action dated Mar. 25, 2022 for JP Application No. 2021014562, 18 page(s).
European search report Mailed on Dec. 20, 2022 for EP Application No. 22152327, 9 page(s).
JP Office Action Mailed on Jul. 27, 2023 for JP Application No. 2022178791, 3 page(s).
Non-Final Rejection Mailed on Jan. 5, 2022 for U.S. Appl. No. 16/781,444, 17 page(s).
Notice of Allowance and Fees Due (PTOL-85) Mailed on Apr. 21, 2022 for U.S. Appl. No. 16/781,444, 9 page(s).
Notice of Allowance and Fees Due (PTOL-85) Mailed on Jun. 10, 2022 for U.S. Appl. No. 16/781,444, 2 page(s).
Non-Final Rejection Mailed on Nov. 22, 2023 for U.S. Appl. No. 17/814,723, 9 page(s).
English Translation of JP Notice of Allowance, including Search Report dated May 29, 2023 for JP Application No. 2022005668, 2 page(s).
English Translation of JP Office Action dated Apr. 5, 2023 for JP Application No. 2022005668, 5 page(s).
English Translation of JP Office Action dated Dec. 7, 2022 for JP Application No. 2022005668, 4 page(s).
English Translation of JP Office Action Mailed on Dec. 7, 2022 for JP Application No. 2022005668.
English Translation of JP Office Action Mailed on Jul. 8, 2022 for JP Application No. 2021014562, 3 pages.
English Translation of JP Office Action, including Search Report, Mailed on Mar. 25, 2022 for JP Application No. 2021014562, 18 pages.
European search report and Search opinion Mailed on Dec. 20, 2022 for EP Application No. 22152327.7.
European search report Mailed on Jul. 1, 2021 for EP Application No. 21154455.
Extended European search report Dated Jul. 1, 2021 for EP Application No. 21154455, 9 pages.
Extended European Search Report Mailed on Jul. 21, 2023 for EP Application No. 23158736, 7 page(s).
JP Notice of Allowance, including Search Report Mailed on May 29, 2023 for JP Application No. 2022005668, 3 page(s).
JP Office Action Mailed on Apr. 5, 2023 for JP Application No. 2022005668, 7 page(s).

(56) References Cited

OTHER PUBLICATIONS

JP Office Action Mailed on Dec. 7, 2022 for JP Application No. 2022005668.
JP Office Action Mailed on Jul. 8, 2022 for JP Application No. 2021014562, 2 pages.
JP Office Action Mailed on Mar. 25, 2022 for JP Application No. 2021014562.
JP Office Action, incluidng Search Report, Mailed on Mar. 25, 2022 for JP Application No. 2021014562, 15 pages.
Non-Final Office Action received for U.S. Appl. No. 16/781,444, mailed on Jan. 5, 2022, 18 pages.
Non-Final Rejection Mailed on Jun. 12, 2023 for U.S. Appl. No. 17/157,986, 11 page(s).
Notice of Allowance received for U.S. Appl. No. 16/781,444, mailed on Apr. 21, 2022, 10 pages.
Notice of Allowance received for U.S. Appl. No. 16/781,444, mailed on Jun. 10, 2022, 2 pages.
Requirement for Restriction/Election Mailed on Mar. 20, 2023 for U.S. Appl. No. 17/157,986, 7 page(s).
Notice of Allowance and Fees Due (PTOL-85) Mailed on Jan. 16, 2024 for U.S. Appl. No. 17/814,723, 9 page(s).
CN Office Action Mailed on Mar. 5, 2024 for CN Application No. 202110156292, 11 page(s).
Communication about intention to grant a European patent Mailed on Jan. 19, 2024 for EP Application No. 22152327, 7 page(s).
Decision to grant a European patent Mailed on Feb. 15, 2024 for EP Application No. 21154455, 2 page(s).
Intention to grant Mailed on Jan. 19, 2024 for EP Application No. 22152327, 9 page(s).
Extended European Search Report Mailed on May 16, 2024 for EP Application No. 24153114, 10 page(s).
Decision to grant a European patent Mailed on May 10, 2024 for EP Application No. 22152327, 2 page(s).
CN Office Action Mailed on Jun. 17, 2024 for CN Application No. 202210090173, 6 page(s).
English Translation of CN Office Action dated Jun. 17, 2024 for CN Application No. 202210090173, 5 page(s).
English Translation of JP Office Action dated Jun. 4, 2024 for JP Application No. 2023106066, 3 page(s).
JP Office Action Mailed on Jun. 4, 2024 for JP Application No. 2023106066, 4 page(s).
MX Notice of Allowance Mailed on May 20, 2024 for MX Application No. MX/A/2021/001312, 6 page(s).
CN Office Action Mailed on May 31, 2024 for CN Application No. 202110156292, 5 page(s).
English Translation of CN Office Action dated May 31, 2024 for CN Application No. 202110156292, 5 page(s).
Liang et al., "Lens design for chromatic confocal displacement sensor," Optical Technique, 45(6):653-659, (Nov. 2019), (abstract).
CN Notice of Allowance Mailed on Aug. 21, 2024 for CN Application No. 202110156292, 7 page(s).

\* cited by examiner

VARIABLE FOCUSING LENS APPARATUS

TECHNOLOGICAL FIELD

Embodiments of the present disclosure generally relate to focusing lens assemblies for imaging apparatuses, such as, but not limited to, barcode and/or other symbology scanners.

BACKGROUND

Applicant has identified many technical challenges and difficulties associated with focusing lens assemblies. For example, many focusing lens assemblies do not provide any mechanisms to determine or set the exact position of the lens.

BRIEF SUMMARY

Various embodiments described herein relate to an example variable focusing lens apparatus, as well as example methods for assembling and operating the example variable focusing lens apparatus.

In accordance with some embodiments of the present disclosure, an example variable focusing lens apparatus is provided. In some embodiments, the example variable focusing lens apparatus comprises a rear pair of coil elements powered by a rear coil current; a front pair of coil elements positioned in front of the rear pair of coil elements and powered by a front coil current; and a barrel lens assembly comprising a top magnetic element secured on a top portion of the barrel lens assembly and a bottom magnetic element secured on a bottom portion of the barrel lens assembly. In some embodiments, the barrel lens assembly is moveable to a plurality of barrel lens assembly positions corresponding to a plurality of current differential ratios associated with the rear coil current and the front coil current.

In some embodiments, the example variable focusing lens apparatus further comprises a rear coil variable power circuitry electronically coupled to the rear pair of coil elements and provides the rear coil current to the rear pair of coil elements, and a front coil variable power circuitry electronically coupled to the front pair of coil elements and provides the front coil current to the front pair of coil elements.

In some embodiments, the rear pair of coil elements define a rear coil magnetic axis. In some embodiments, the front pair of coil elements define a front coil magnetic axis. In some embodiments, the top magnetic element and the bottom magnetic element are positioned between the front coil magnetic axis and the rear coil magnetic axis.

In some embodiments, at least one lens element is secured within the barrel lens assembly. In some embodiments, the at least one lens element defines an optical axis. In some embodiments, the plurality of barrel lens assembly positions are along the optical axis.

In some embodiments, the barrel lens assembly comprises a lens aperture. In some embodiments, the at least one lens element is secured within the lens aperture.

In some embodiments, the barrel lens assembly comprises a lens barrel. In some embodiments, the lens aperture is positioned within the lens barrel. In some embodiments, the top magnetic element and the bottom magnetic element are secured to the barrel lens assembly.

In some embodiments, the rear pair of coil elements comprises a top rear coil element and a bottom rear coil element. In some embodiments, the front pair of coil elements comprises a top front coil element and a bottom front coil element.

In some embodiments, the top rear coil element is connected to a dual coil board at a top end of a front surface of the dual coil board. In some embodiments, the bottom rear coil element is connected to the dual coil board at a bottom end of the front surface of the dual coil board.

In some embodiments, the top front coil element is positioned in front of the top rear coil element. In some embodiments, the bottom front coil element is positioned in front of the bottom rear coil element.

In some embodiments, the example variable focusing lens apparatus further comprises a holder cover positioned between the top rear coil element and the bottom rear coil element.

In some embodiments, the holder cover defines a holder cover central opening and comprises a plurality of holder cover threads disposed on an inner periphery surface of the holder cover.

In some embodiments, the example variable focusing lens apparatus further comprises a rear stop nut defining a rear stop nut central opening and comprising a plurality of rear stop nut threads disposed on an outer periphery surface of the rear stop nut. In some embodiments, the plurality of rear stop nut threads of the rear stop nut engages with the plurality of holder cover threads of the holder cover.

In some embodiments, when the barrel lens assembly is at a rear-most barrel lens assembly position, the barrel lens assembly is in contact with the rear stop nut.

In some embodiments, the example variable focusing lens apparatus comprises a module holder. In some embodiments, the barrel lens assembly is at least partially positioned within the module holder.

In some embodiments, the module holder defines a module holder central opening and comprises a plurality of module holder threads disposed on an inner periphery surface of the module holder.

In some embodiments, the example variable focusing lens apparatus further comprises a front stop nut defining a front stop nut central opening and comprising a plurality of front stop nut threads disposed on an outer periphery surface of the front stop nut. In some embodiments, the plurality of front stop nut threads engages with the plurality of module holder threads of the module holder.

In some embodiments, when the barrel lens assembly is at a front-most barrel lens assembly position, the barrel lens assembly is in contact with the front stop nut.

In some embodiments, the rear pair of coil elements and the front pair of coil elements are positioned between the module holder and the dual coil board.

In some embodiments, the barrel lens assembly comprises at least one bearing ball holding portion disposed on an outer surface of the barrel lens assembly. In some embodiments, at least one bearing ball is positioned on the at least one bearing ball holding portion.

In some embodiments, the module holder comprises at least one bearing ball moving rail disposed on an inner surface of the module holder. In some embodiments, the at least one bearing ball is moveable along the at least one bearing ball moving rail.

The foregoing illustrative summary, as well as other exemplary objectives and/or advantages of the disclosure, and the manner in which the same are accomplished, are further explained in the following detailed description and its accompanying drawings.

BRIEF DESCRIPTION OF THE DRAWINGS

The description of the illustrative embodiments may be read in conjunction with the accompanying figures. It will be appreciated that, for simplicity and clarity of illustration, elements illustrated in the figures have not necessarily been drawn to scale, unless described otherwise. For example, the dimensions of some of the elements may be exaggerated relative to other elements, unless described otherwise. Embodiments incorporating teachings of the present disclosure are shown and described with respect to the figures presented herein, in which.

DETAILED DESCRIPTION OF THE INVENTION

Figure 1A:
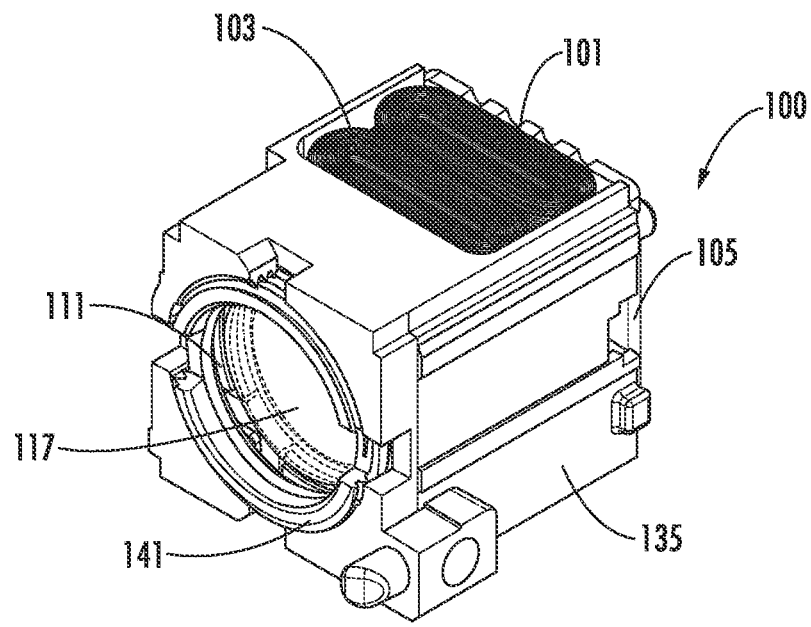
FIG. 1A illustrates an example front perspective view of an example variable focusing lens apparatus in accordance with various embodiments of the present disclosure.

Some embodiments of the present disclosure will now be described more fully hereinafter with reference to the accompanying drawings, in which some, but not all embodiments of the disclosure are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout.

In the present disclosure, the phrases "in one embodiment," "according to one embodiment," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

In the present disclosure, the words "example" or "exemplary" are used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that a specific component or feature is not required to be included or to have the characteristic. Such a component or feature may be optionally included in some embodiments, or it may be excluded.

In the present disclosure, the terms "electronically coupled," "electrically coupled," "electronically connected," or "electrically connected" in the present disclosure refer to two or more electrical elements (for example but not limited to, coil elements) and/or electric circuit(s) (for example but not limited to, coil variable power circuitries) being connected through wired means (for example but not limited to, conductive wires or traces) and/or wireless means (for example but not limited to, electromagnetic field), such that energy (for example but not limited to electric current), signals, data and/or information may be transmitted to and/or received from the electrical elements and/or electric circuit(s) that are electronically coupled.

In the present disclosure, the term "powering" refers to providing an electric current to an electrical circuit, component, and/or electrical conductor.

In the present disclosure, the term "element" in the present disclosure refers to one or more separable component(s) or independent unit(s) that may be used to form, construct, or otherwise be part of an example variable focusing lens apparatus. In some embodiments, an element may comprise one or more physical entities/structures that may provide one or more particular functions to the example variable focusing lens apparatus.

In the present disclosure, the term "coil element" refers to an electrical conductor (for example, but not limited to, a current carrying wire) that is wound, with one or more turns, into a circular or cylindrical shape.

In accordance with some embodiments of the present disclosure, an example coil element generates a magnetic field upon being powered by a current. In particular, under Ampere's law, a current through any conductor creates a circular magnetic field around the conductor. The magnetic fields generated by the separate turns of a coil element all pass through the center of the coil element and add (or superpose) to produce a magnetic field of the coil element. In some embodiments, the magnetic field of the coil element may cause a magnetic force that attracts or repulses a magnetic element (such as a magnet). In some embodiments, the strength of the magnetic force of the magnetic field generated by the coil element correlates to the amount of current passing through the coil element. For example, the more the current that flows through the coil element, the stronger the magnetic field that is generated by the coil element, and the stronger the magnetic force. The less the current that flows through the coil element, the weaker the magnetic field that is generated by the coil element, and the weaker the magnetic force.

In some embodiments, the direction of the magnetic field produced by a coil element can be determined by the right hand grip rule. In particular, if the fingers of the right hand are wrapped around the coil element in the direction of current flowing through the coil element, the thumb of the right hand will point along the magnetic axis of the magnetic field and in the direction of the magnetic North of the magnetic field generated by the coil element, and the direction opposite to the direction pointed by the thumb of the right hand is the magnetic South of the magnetic field generated by the coil element.

In some embodiments, example coil elements in accordance with some embodiments of the present disclosure may comprise material such as, but not limited to, copper wire, coated copper wire, tinned wire, and/or the like. In some embodiments, different coil elements in accordance with some embodiments of the present disclosure may comprise different materials In the present disclosure, the term "magnetic element" refers to an element that produces a magnetic field. Examples of the magnetic element may include, but are not limited to, magnets.

In the present disclosure, the term "magnetic axis" refers to a straight line that joins magnetic poles of one or more magnetic fields. In some embodiments, the magnetic axis of a magnetic field generated by a coil element overlaps with the central axis of the coil element. Examples of magnetic axes are illustrated and described herein.

In the present disclosure, the term "module holder" refers to a shell or a housing within which example components of an example variable focusing lens apparatus in accordance with various embodiments of the present disclosure may be positioned. For example, an example module holder may provide housing for at least a portion of an example barrel lens assembly in accordance with some embodiments of the present disclosure, details of which are described herein.

As described above, there are many technical challenges and difficulties associated with focusing lens assemblies.

For example, many focusing lens assemblies do not provide any mechanism to determine the exact position of the lens. As an example, positioning of lens by a voice coil motor lens actuator is the result of the magnetic force (introduced by the coil drive current) against a leaf spring returning force. In such an example, the exact lens position cannot be determined as the spring force and magnetic force can change due to component aging, temperature, among other factors. In addition, gravity and friction can introduce residual positioning errors and limit the accuracy in determining the lens positions.

While some focusing lens assemblies (such as voice coil motor variable focusing lens) may implement a close-control loop to determine the lens position, feedback from the close-control loop can provide a slow response and cause delay in ascertaining the exact position of the lens. In some examples, a position sensor may be added to determine the exact position of the lens; however, adding position sensor increases manufacturing cost while still providing a limited response time. As such, there is a need for a direct addressing open-loop variable focusing lens apparatus that provides a fast response so that it can be implemented in, for example but not limited to, industrial imaging scanners.

Various embodiments of the present disclosure overcome these technical challenges and difficulties, and provide various technical improvements and benefits. For example, an example variable focusing lens apparatus in accordance with some embodiments of the present disclosure comprises double coil elements, and the position of the lens is exactly proportional to the drive current ratio (also referred to as current differential ratio) of the double coil elements. In particular, the example variable focusing lens apparatus utilizes electromagnetic lens actuators that include coil elements and magnetic elements to move a barrel lens assembly precisely to different barrel lens assembly positions according to the drive current ratio. As such, various embodiments of the present disclosure provide an open-loop, one-stop action that can reduce the response time to the level of sub-millisecond. Such fast-acting actuators can enable variable focusing in bar code scanning without introducing processing delay, therefore providing highly reliable positioning accuracy for the industry scanning application.

For example, in accordance with various embodiments of the present disclosure, a pair of coil elements are arranged parallel to the optical axis of the barrel lens assembly, and the barrel lens assembly comprises magnetic elements. In some embodiments, the pair of coil elements are wired in the opposite directions (or the currents in the pair of coil elements flow in the opposite directions), such that the magnetic elements are in the middle point between the two coil centers when equal currents are applied to the pair of coil element. When a specific ratio of the currents between the pair of coil elements is applied, the magnetic elements may move to a position between two coil centers. In some embodiments, the position of the magnetic elements between two coil centers is exactly proportional to the drive current ratio applied to the pair of coil elements.

In some embodiments, the positions of the front stop nut and the rear stop nut define the extreme near and far focusing position of the barrel lens assembly. In some embodiments, the positions of the barrel lens assembly between the two extreme positions are controlled by the coil driving current. In some embodiments, after the front stop nut and the rear stop nut are adjusted and secured, the current setting can be calibrated based on these two known extreme positions. In some embodiments, the movement of the barrel lens assembly to any desired position can be achieved in one-step current setting with minimum response time needed.

In various embodiments of the present disclosure, the positions of the barrel lens assembly is a function of the ratio of the coil currents, and component aging and temperature change do not change or affect the positions of the barrel lens assembly. Because of the high margin of the drive current, other factors (such as friction, gravity and other changes) may have a very low impact on the positions of the barrel lens assembly, if any. As such, various embodiments of the present disclosure provide a proportional lens actuator that can reliably provide the position of the barrel lens assembly based on drive current ratio, and the margin of the drive current level can minimize any residual position variations.

In various embodiments of the present disclosure, the barrel lens assembly may move thanks to ball-rail movement with no returning spring force from a spring mechanism in the opposite direction, therefore reducing the current required to power the coil elements to move the barrel lens assembly and lowering the power consumption needed for positioning the barrel lens assembly. In addition, by eliminating the spring mechanism, resonances are also eliminated, which allows fast lens moving and minimizes the response time.

As such, various embodiments of the present disclosure may implement two pairs of cored coils that are arranged side by side with coil axis perpendicular to the focusing direction (e.g. the optical axis of the barrel lens assembly), as well as magnets that are positioned on the opposite sides of the barrel lens assembly. As described further herein, the focusing displacement function and the positions of the barrel lens assembly can be directly determined based on the direct ratio of the drive current.

Various embodiments of the present disclosure may be implemented in a broad range of applications. For example, in the barcode scanning application, the barrel lens assembly can be configured in three discrete positions (near, middle and far positions) to cover the entire object distance with overlaps in the depth of field of each segment. In some embodiments, to provide an extended range, five predefined positions can cover ultra-high density codes in very close range, high density codes in close range, normal density codes in middle range, low density codes in extended range and big codes in extra-far range. Additionally, or alternatively, the barrel lens assembly can be configured to move through continuous positions without the limitation of a predetermined number of positions.

Referring now to FIG. 1A to FIG. 1H an example variable focusing lens apparatus 100 in accordance with various embodiments of the present disclosure is illustrated. The example variable focusing lens apparatus 100 overcomes the technical challenges and difficulties described above, and provides technical improvements and benefits.

Figure 1B:
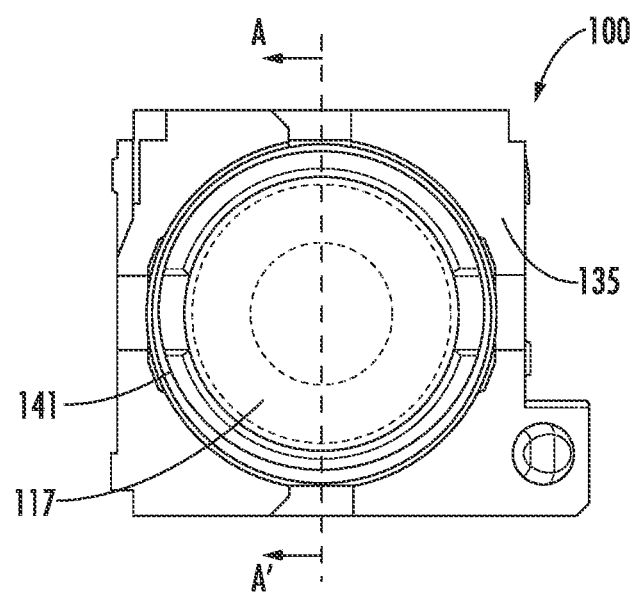
FIG. 1B illustrates an example front view of the example variable focusing lens apparatus shown in FIG. 1A in accordance with various embodiments of the present disclosure.

In particular, FIG. 1A illustrates an example front perspective view of the example variable focusing lens apparatus 100, and FIG. 1B illustrates an example front view of the example variable focusing lens apparatus 100.

In the example shown in FIG. 1A, the example variable focusing lens apparatus 100 may comprise a module holder 135 and a dual coil board 105.

In some embodiments, the dual coil board 105 may be in the form of a print circuit board (PCB). For example, the dual coil board 105 may comprise non-conductive substrate materials with layers of copper circuitry that is buried internally or disposed on the external surface. In some embodiments, the copper circuitry may connect one or more electronic components of the example variable focusing lens apparatus 100 to one or more other electronic components of the example variable focusing lens apparatus 100. For example, the example variable focusing lens apparatus 100 may comprise a plurality of coil elements, and the dual coil board 105 may connect each of the plurality of coil elements to one or more coil variable power circuitries, details of which are described herein.

In the example shown in FIG. 1A, the plurality of coil elements of the example variable focusing lens apparatus 100 may comprise a rear pair of coil elements 101 and a front pair of coil elements 103. For example, the rear pair of coil elements 101 and the front pair of coil elements 103 are positioned between the module holder 135 and the dual coil board 105.

In some embodiments, the rear pair of coil elements 101 may comprise a pair of coil elements that are connected to the dual coil board 105 and/or secured to the front surface of the dual coil board 105. For example, one of the coil elements in the rear pair of coil elements 101 is secured to/connected to the dual coil board 105 at a top end of the front surface of the dual coil board 105, while the other of the coil elements in the rear pair of coil elements 101 is secured to/connected to the dual coil board 105 at a bottom end of the front surface of the dual coil board 105, details of which are described herein.

As described above, each of the rear pair of coil elements 101 may comprise an electrical conductor (such as a current carrying wire) that is wound, with one or more turns, into a circular or cylindrical shape. In some embodiments, each of the rear pair of coil elements 101 may comprise the same material, such as, but not limited to, copper wire, coated copper wire, tinned wire, and/or the like. In some embodiments, the rear pair of coil elements 101 may comprise different materials.

In some embodiments, the front pair of coil elements 103 is positioned in front of the rear pair of coil elements 101.

In the example shown in FIG. 1A, the front pair of coil elements 103 is positioned between the module holder 135 and the rear pair of coil elements 101. In some embodiments, the rear pair of coil elements 101 may comprise a pair of coil elements that are positioned on the top of the example variable focusing lens apparatus 100 and on the bottom of the example variable focusing lens apparatus 100, respectively. For example, one of the coil elements in the front pair of coil elements 103 is positioned in front of one of the rear pair of coil elements 101 that is secured to a top end of the dual coil board 105, while the other of the coil elements in the front pair of coil elements 103 is positioned in front of one of the rear pair of coil elements 101 that is secured to a bottom end of the dual coil board 105, details of which are described herein.

Similar to those described above, each of the front pair of coil elements 103 may comprise an electrical conductor (such as a current carrying wire) that is wound, with one or more turns, into a circular or cylindrical shape. In some embodiments, each of the front pair of coil elements 103 may comprise the same material, such as, but not limited to, copper wire, coated copper wire, tinned wire, and/or the like. In some embodiments, the front pair of coil elements 103 may comprise different materials.

In some embodiments, the coil direction of the rear pair of coil elements 101 may be different from the coil direction of the front pair of coil elements 103. For example, coils in the rear pair of coil elements 101 may be wound clockwise when the rear pair of coil elements 101 is viewed from the top down, and coils in the front pair of coil elements 103 may be wound counter-clockwise wen the front pair of coil elements 103 is viewed from the top down.

As described above, the module holder 135 may provide a shell or a housing for various components of the example variable focusing lens apparatus 100. In the example shown in FIG. 1A, the barrel lens assembly 111 is at least partially disposed within the module holder 135. For example, as shown in FIG. 1D, the module holder 135 may comprise a plurality of walls that define a rear opening for receiving the barrel lens assembly 111.

In some embodiments, the barrel lens assembly 111 is moveable within the module holder 135, details of which are described herein.

In some embodiments, the module holder 135 may comprise a module holder central opening that defines/comprises an inner periphery surface of the module holder 135. In some embodiments, a front stop nut 141 may be secured to the inner periphery surface of the module holder 135 and prevents the barrel lens assembly 111 from moving out of the module holder 135 through the module holder central opening, details of which are described herein.

Referring now to FIG. 1B, the example barrel lens assembly 111 may comprise at least one lens element 117. In particular, the at least one lens element 117 is aligned with the module holder central opening, such that light enters through the module holder central opening of the module holder 135 and onto the at least one lens element 117. In some embodiments, the at least one lens element 117 defines the axis that passes through the center of the at least one lens element 117 as the optical axis of at least one lens element 117, and the barrel lens assembly 111 is movable to a plurality of barrel lens assembly positions along the optical axis of the at least one lens element 117, details of which are described herein.

Figure 1C:
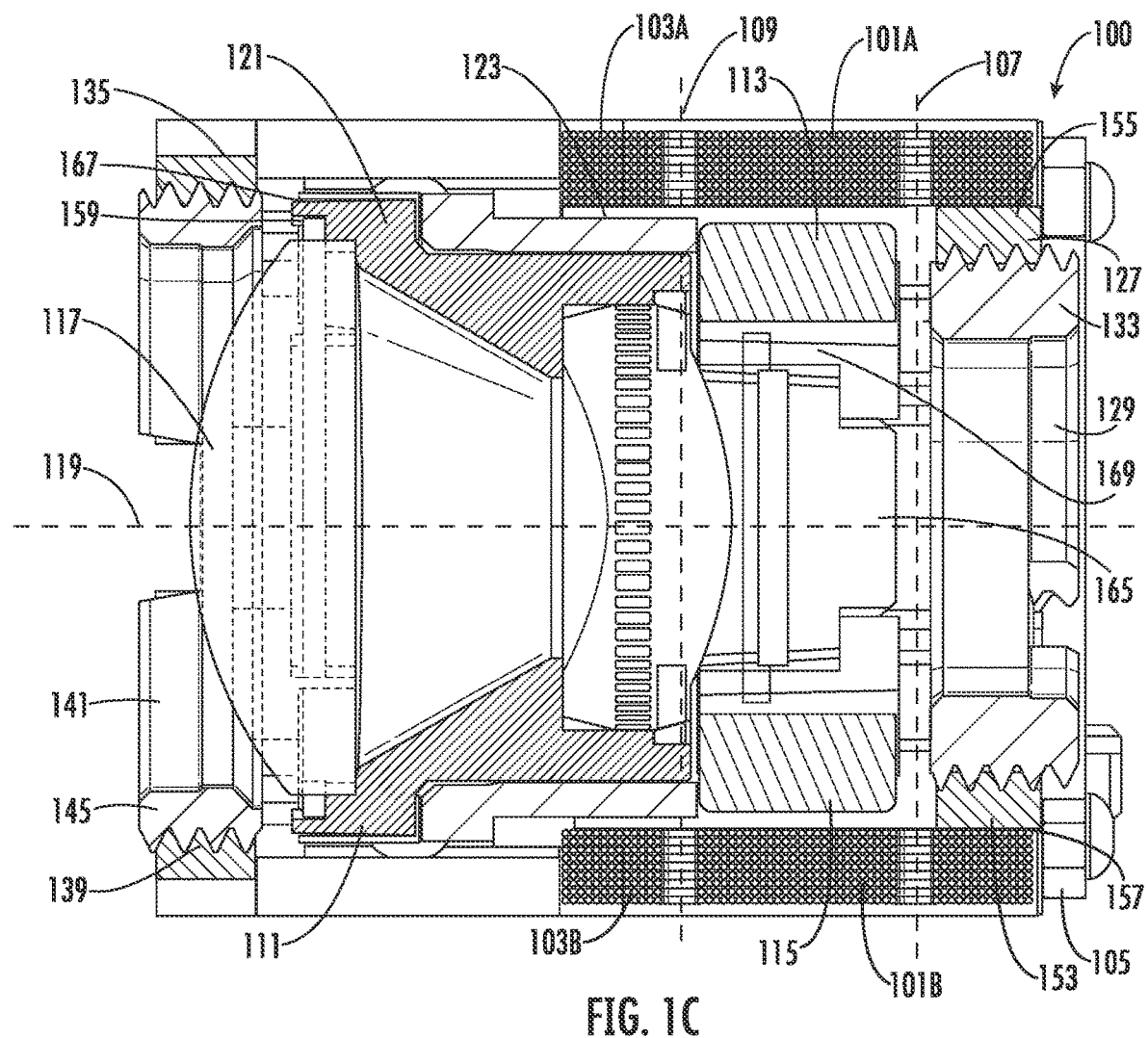
FIG. 1C illustrates an example cross section view of the example variable focusing lens apparatus shown in FIG. 1A in accordance with various embodiments of the present disclosure.
Figure 1D:
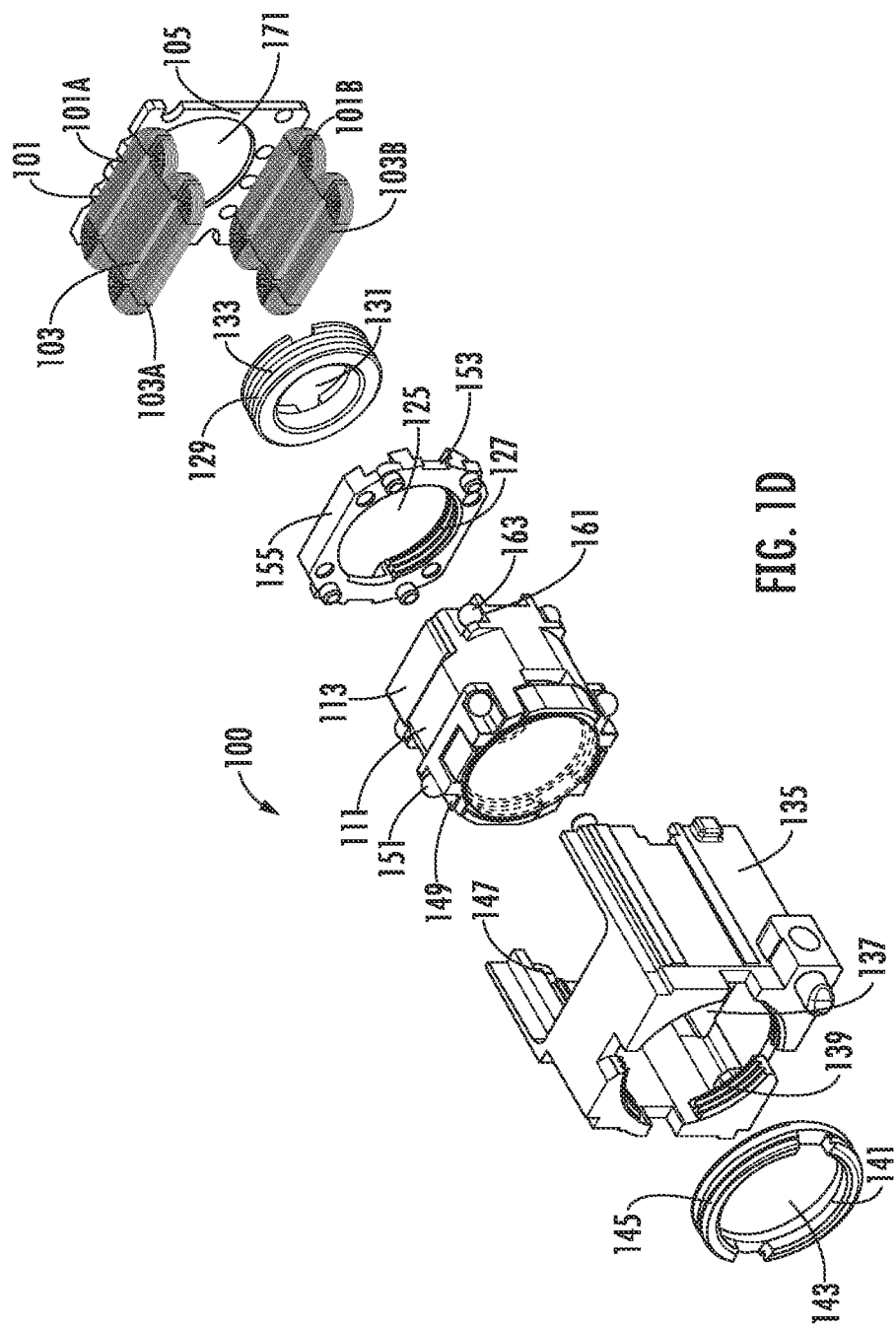
FIG. 1D illustrates an example exploded view of the example variable focusing lens apparatus shown in FIG. 1A in accordance with various embodiments of the present disclosure.

Referring now to FIG. 1C and FIG. 1D, an example cross section view and an example exploded view of the example variable focusing lens apparatus 100 are shown. In particular, FIG. 1C illustrates an example cross section view of the example variable focusing lens apparatus 100 when the example variable focusing lens apparatus 100 is cut from line A-A' and viewed in the direction as shown in FIG. 1B. FIG. 1D illustrates an example exploded view of the example variable focusing lens apparatus 100.

As described above in connection with FIG. 1A, the example variable focusing lens apparatus 100 comprises a rear pair of coil elements 101 disposed on a front surface of a dual coil board 105, and a front pair of coil elements 103 positioned in front of the rear pair of coil elements 101. In the example shown in FIG. 1C and FIG. 1D, the rear pair of coil elements 101 comprises a top rear coil element 101A and a bottom rear coil element 101B, and the front pair of coil elements 103 comprises a top front coil element 103A and a bottom front coil element 103B.

In some embodiments, the top rear coil element 101A is secured to/positioned at/connected to the dual coil board 105 at a top end of the front surface of the dual coil board 105. For example, the top rear coil element 101A may be connected to copper circuitries that are disposed at the top end of the dual coil board 105, and the dual coil board 105 may connect the top rear coil element 101A to a rear coil variable power circuitry that provides power to the top rear coil element 101A, details of which are described herein.

In some embodiments, the top front coil element 103A is positioned in front of the top rear coil element 101A. For example, the top front coil element 103A may be connected to copper circuitries that are disposed at the top end of the dual coil board 105 and extend further to the front in comparison with the copper circuitries that are connected to the top rear coil element 101A. As such, the top front coil element 103A is positioned in front of the top rear coil element 101A. In some embodiments, one or more nonconductive material (such as, but not limited to, ceramics, plastics, and/or the like) may segregate wires in the top front coil element 103A from wires in the top rear coil element 101A, such that the top rear coil element 101A and the top front coil element 103A do not short-circuit.

In some embodiments, the bottom rear coil element 101B is secured to/positioned at/connected to the dual coil board 105 at a bottom end of the front surface of the dual coil board 105. For example, the bottom rear coil element 101B may be connected to copper circuitries that are disposed at the bottom end of the dual coil board 105, and the dual coil board 105 may connect the bottom rear coil element 101B to a rear coil variable power circuitry that provides power to the bottom rear coil element 101B, details of which are described herein.

In some embodiments, the bottom front coil element 103B is positioned in front of the bottom rear coil element 101B. For example, the bottom front coil element 103B may be connected to copper circuitries that are disposed at the bottom end of the dual coil board 105 and extend further to the front in comparison with the copper circuitries that are connected to the bottom rear coil element 101B. As such, the bottom front coil element 103B is positioned in front of the bottom rear coil element 101B. In some embodiments, one or more nonconductive material (such as, but not limited to, ceramics, plastics, and/or the like) may segregate wires in the bottom front coil element 103B from wires in the bottom rear coil element 101B, such that the bottom rear coil element 101B and the bottom front coil element 103B do not short-circuit.

While the description above provides some examples of securing the top rear coil element 101A, the top front coil element 103A, the bottom rear coil element 101B, and the bottom front coil element 103B, it is noted that the scope of the present disclosure is not limited to the examples above. In some examples, an example variable focusing lens apparatus in accordance with some embodiments of the present disclosure may secure the top rear coil element 101A, the top front coil element 103A, the bottom rear coil element 101B, and/or the bottom front coil element 103B differently than those examples described above.

For example, the top front coil element 103A and the top rear coil element 101A may be secured between a front surface of the dual coil board 105 and a top portion of module holder 135 through, for example but not limited to, an interference fit, and the top front coil element 103A may be positioned in front of the top rear coil element 101A.

Additionally, or alternatively, the bottom front coil element 103B and the bottom rear coil element 101B may be secured between a front surface of the dual coil board 105 and a bottom portion of module holder 135 through, for example but not limited to, an interference fit, and the bottom front coil element 103B may be positioned in front of the bottom rear coil element 101B.

Additionally, or alternatively, the top front coil element 103A and the top rear coil element 101A may be secured at a top portion of the module holder 135, and the bottom front coil element 103B and the bottom rear coil element 101B may be secured at a bottom portion of the module holder 135. For example, as described further in detail in connection with at least FIG. 1G and FIG. 3A to FIG. 3F, the module holder 135 may comprise a top left recessed edge and a top right recessed edge, and the top front coil element 103A and the top rear coil element 101A may be secured to the top portion of the module holder 135 between the top left recessed edge and the top right recessed edge. Similarly, the module holder 135 may comprise a bottom left recessed edge and a bottom right recessed edge, and the bottom front coil element 103B and the bottom rear coil element 101B may be secured to the bottom portion of the module holder 135 between the bottom left recessed edge and the bottom right recessed edge.

Additionally, or alternatively, example embodiments of the present disclosure may secure the top rear coil element 101A, the top front coil element 103A, the bottom rear coil element 101B, and/or the bottom front coil element 103B through other means and/or in other ways.

As described above, an example coil element in accordance with some embodiments of the present disclosure generates a magnetic field upon being powered by a current. The magnetic axis, as well as the magnetic North and the magnetic South, of the magnetic field produced by the coil element can be determined by the right hand grip rule. In particular, the magnetic axis of a magnetic field generated by a coil element overlaps with the central axis of the coil element.

In some embodiments, the rear pair of coil elements 101 are powered by a rear coil current. For example, the central axis of the top rear coil element 101A and the central axis of the bottom rear coil element 101B overlap with one another. For example, the top rear coil element 101A and the bottom rear coil element 101B may be of the same size (for example, the circular or cylindrical shapes formed by the top rear coil element 101A and the bottom rear coil element 101B have the same diameter). In such embodiments, the magnetic axis of the magnetic field generated by the top rear coil element 101A and the magnetic axis of the magnetic field generated by the bottom rear coil element 101B may be aligned with one another. As such, the rear pair of coil elements 101 (e.g. the top rear coil element 101A and the bottom rear coil element 101B) defines/provides a rear coil magnetic axis 107 that connects the magnetic axis of the magnetic field generated by the top rear coil element 101A and the magnetic axis of the magnetic field generated by the bottom rear coil element 101B. In some embodiments, the rear coil magnetic axis 107 is aligned with the central axis of the top rear coil element 101A and the central axis of the bottom rear coil element 101B. Additional details of the rear coil magnetic axis 107 are described herein, including, but not limited to, those described herein in connection with FIG. 6A to FIG. 6C.

As described above, a front pair of coil elements 103 are positioned in front of the rear pair of coil elements 101. In some embodiments, the front pair of coil elements 103 are powered by a front coil current. In some embodiments, the central axis of the top front coil element 103A and the central axis of the bottom front coil element 103B overlap with one another. For example, the top front coil element 103A and the bottom front coil element 103B may be of the same size (for example, the circular or cylindrical shapes formed by the top front coil element 103A and the bottom front coil element 103B have the same diameter). In such embodiments, the magnetic axis of the magnetic field generated by the top front coil element 103A and the magnetic axis of the magnetic field generated by the bottom front coil element 103B may be aligned with one another. As such, the front pair of coil elements 103 (e.g. the top front coil element 103A and the bottom front coil element 103B) defines/provides a front coil magnetic axis 109 that connects the magnetic axis of the magnetic field generated by the top front coil element 103A and the magnetic axis of the magnetic field generated by the bottom front coil element 103B. In some embodiments, the front coil magnetic axis 109 is aligned with the central axis of the top front coil element 103A and the central axis of the bottom front coil element 103B. Additional details of the front coil magnetic axis 109 are described herein, including, but not limited to, those described herein in connection with FIG. 6A to FIG. 6C.

In some embodiments, the rear coil magnetic axis 107 and the front coil magnetic axis 109 are in a parallel arrangement with one another. As described above, the front pair of coil elements 103 is positioned in front of the rear pair of coil elements 101. As such, the front coil magnetic axis 109 is positioned in front of the rear coil magnetic axis 107.

As shown in FIG. 1C and FIG. 1D, the example variable focusing lens apparatus 100 comprises a holder cover 153.

In some embodiments, the holder cover 153 is positioned between the top rear coil element 101A and the bottom rear coil element 101B. For example, the holder cover 153 may comprise a top surface 155 and a bottom surface 157. In some embodiments, both the top surface 155 and the bottom surface 157 are on the horizontal plane. In some embodiments, the top rear coil element 101A is in contact with the top surface 155 of the holder cover 153. In some embodiments, the bottom rear coil element 101B is in contact with the bottom surface 157 of the holder cover 153.

In some embodiments, the holder cover 153 may be in a shape similar to an annular cylinder shape. For example, the holder cover 153 may define/comprise a holder cover central opening that is positioned at the center of the holder cover 153. In some embodiments, the holder cover central opening may be in a shape similar to a circular shape. In some embodiments, the center of the holder cover central opening overlaps with the center of the holder cover 153. An example holder cover central opening 125 of the holder cover 153 is illustrated in FIG. 1D.

In some embodiments, the holder cover central opening 125 defines/comprises an inner periphery surface of the holder cover 153. In some embodiments, the holder cover 153 comprises a plurality of holder cover threads 127 disposed on the inner periphery surface of the holder cover 153. For example, the plurality of holder cover threads 127 may be in the form of internal threads (also referred to as female threads) that are on the inside of the holder cover 153. In such an example, the holder cover central opening 125 of the holder cover 153 is in the form of a threaded through-hole that provides the plurality of holder cover threads 127.

As shown in FIG. 1C and FIG. 1D, the example variable focusing lens apparatus 100 comprises a rear stop nut 129.

In some embodiments, the rear stop nut 129 may be in a shape similar to an annular cylinder shape. For example, the rear stop nut 129 may define/comprise a rear stop nut central opening that is positioned at the center of the rear stop nut 129. In some embodiments, the rear stop nut central opening may be in a shape similar to a circular shape. In some embodiments, the center of the rear stop nut central opening overlaps with the center of the rear stop nut 129. An example rear stop nut central opening 131 of the rear stop nut 129 is illustrated in FIG. 1D.

In some embodiments, the rear stop nut 129 comprises an outer periphery surface. In some embodiments, the rear stop nut 129 comprises a plurality of rear stop nut threads 133 that are disposed on the outer periphery surface of the rear stop nut 129. For example, the plurality of rear stop nut threads 133 may be in the form of external threads (also referred to as male threads) that are on the outer surface of the rear stop nut 129.

In some embodiments, the plurality of rear stop nut threads 133 of the rear stop nut 129 engages with the plurality of holder cover threads 127 of the holder cover 153, so that the rear stop nut 129 is secured to the holder cover 153. For example, to secure the rear stop nut 129 to the holder cover 153, the rear stop nut 129 may be positioned within the holder cover central opening 125 of the holder cover 153, and the plurality of rear stop nut threads 133 of the rear stop nut 129 may mate with the plurality of holder cover threads 127 of the holder cover 153.

As described above, the example variable focusing lens apparatus 100 comprises the module holder 135.

In some embodiments, the holder cover 153 is secured to the module holder 135. For example, as shown in FIG. 1D, the module holder 135 comprises a rear end, and the holder cover 153 is secured to the rear end of the module holder 135.

In some embodiments, the module holder 135 may comprise a front wall that defines/comprises a module holder central opening. In some embodiments, the module holder central opening may be in a shape similar to a circular shape. In some embodiments, the center of the module holder central opening overlaps with the central axis of the module holder 135. An example module holder central opening 137 of the module holder 135 is illustrated in FIG. 1D.

In some embodiments, the module holder central opening 137 defines/comprises an inner periphery surface of the module holder 135. In some embodiments, the module holder 135 comprises a plurality of module holder threads 139 disposed on the inner periphery surface of the module holder 135. For example, the plurality of module holder threads 139 may be in the form of internal threads (also referred to as female threads) that are on the inside of the module holder 135. In such an example, the module holder central opening 137 of the module holder 135 is in the form of a threaded through-hole that provides the plurality of module holder threads 139.

As shown in FIG. 1C and FIG. 1D, the example variable focusing lens apparatus 100 comprises a front stop nut 141.

In some embodiments, the front stop nut 141 may be in a shape similar to an annular cylinder shape. For example, the front stop nut 141 may define/comprise a front stop nut central opening that is positioned at the center of the front stop nut 141. In some embodiments, the front stop nut central opening may be in a shape similar to a circular shape. In some embodiments, the center of the front stop nut central opening overlaps with the center of the front stop nut 141. An example front stop nut central opening 143 of the front stop nut 141 is illustrated in FIG. 1D.

In some embodiments, the front stop nut 141 comprises an outer periphery surface. In some embodiments, the front stop nut 141 comprises a plurality of front stop nut threads 145 that are disposed on the outer periphery surface of the front stop nut 141. For example, the plurality of front stop nut threads 145 may be in the form of external threads (also referred to as male threads) that are on the outer surface of the front stop nut 141.

In some embodiments, the plurality of front stop nut threads 145 of the front stop nut 141 engages with the plurality of module holder threads 139 of the module holder 135, so that the front stop nut 141 is secured to the module holder 135. For example, to secure the front stop nut 141 to the module holder 135, the front stop nut 141 may be positioned within the module holder central opening 137 of the module holder 135, and the plurality of front stop nut threads 145 of the front stop nut 141 may mate with the plurality of module holder threads 139 of the module holder 135.

As shown in FIG. 1C and FIG. 1D, the barrel lens assembly 111 is at least partially positioned within the module holder 135.

In some embodiments, the barrel lens assembly 111 comprises a lens aperture 121. In some embodiments, the lens aperture 121 defines/comprises one or more aperture holes, aperture openings, and/or aperture structures where light can travel through.

In the example shown in FIG. 1C, the lens aperture 121 defines a front aperture opening 159. For example, light may travel through the front aperture opening 159. The lens aperture 121 also defines a rear aperture opening 165. For example, light may exist from the barrel lens assembly 111 through the rear aperture opening 165. In some embodiments, the front aperture opening 159 is connected to the rear aperture opening 165. In some embodiments, the diameter of the front aperture opening 159 is different from the diameter of the rear aperture opening 165. For example, the diameter of the front aperture opening 159 may be larger than the diameter of the rear aperture opening 165.

In some embodiments, the barrel lens assembly 111 comprises at least one lens element 117 secured within the lens aperture 121. For example, the at least one lens element 117 may be secured within the front aperture opening 159. As described above, the at least one lens element 117 defines/provides an optical axis 119 that passes through the center of the at least one lens element 117. In some embodiments, the optical axis 119 defines/illustrates a path along which light propagates through the barrel lens assembly 111.

In the example shown in FIG. 1C, the front coil magnetic axis 109 is in a perpendicular arrangement with the optical axis 119. In such an example, the central axis of the front pair of coil elements 103 is perpendicular to the central axis of the barrel lens assembly 111. Similarly, the rear coil magnetic axis 107 is in a perpendicular arrangement with the optical axis 119. In such an example, the central axis of the rear pair of coil elements 101 is perpendicular to the central axis of the barrel lens assembly 111.

In some embodiments, the barrel lens assembly 111 comprises a lens barrel 123. In some embodiments, the lens barrel 123 provides a shell or a housing for various components of the barrel lens assembly 111. For example, as shown in FIG. 1C, the lens aperture 121 is positioned within the lens barrel 123. In some embodiments, the lens barrel 123 defines/comprises one or more holes, openings, and/or aperture structures that correspond to the one or more holes, openings, and/or aperture structures of the lens aperture 121. In the example shown in FIG. 1C, the lens barrel 123 defines a front barrel opening 167 and a rear barrel opening 169. For example, the front aperture opening 159 is within the front barrel opening 167, and the rear aperture opening 165 is within the rear barrel opening 169. In some embodiments, the diameter of the front barrel opening 167 is different from the diameter of the rear barrel opening 169. For example, the diameter of the front barrel opening 167 may be larger than the diameter of the rear barrel opening 169, similar to those described above. In some embodiments, the diameter of the front barrel opening 167 is larger than the diameter of the front aperture opening 159. In some embodiments, the diameter of the rear barrel opening 169 is larger than the diameter of the rear aperture opening 165.

In some embodiments, the barrel lens assembly 111 comprises a top magnetic element 113 secured on a top portion of the barrel lens assembly 111 and a bottom magnetic element 115 secured on a bottom portion of the barrel lens assembly 111. In the example shown in FIG. 1C, the top magnetic element 113 is secured/attached to a top surface of the lens barrel 123, and the bottom magnetic element 115 is secured/attached to a bottom surface of the lens barrel 123. In some embodiments, each of the top magnetic element 113 and the bottom magnetic element 115 may comprise a magnet.

In some embodiments, the top magnetic element 113 and the bottom magnetic element 115 are positioned between the front coil magnetic axis 109 and the rear coil magnetic axis 107. In the example shown in FIG. 1C, both the top magnetic element 113 and the bottom magnetic element 115 are positioned at the rear portion of lens barrel 123, such that they are positioned between the central axes of the rear pair of coil elements 101 and the front pair of coil elements 103. For example, both the top magnetic element 113 and the bottom magnetic element 115 are positioned behind the front coil magnetic axis 109, and in front of the rear coil magnetic axis 607.

In some embodiments, the positions of the top magnetic element 113 and the bottom magnetic element 115 are symmetric with respect to the optical axis 119. For example, a distance from the top magnetic element 113 to the optical axis 119 is the same as a distance from the bottom magnetic element 115 to the optical axis 119.

In some embodiments, the positions of the top rear coil element 101A and the bottom rear coil element 101B are symmetric with respect to the optical axis 119. For example, a distance from the top rear coil element 101A to the optical axis 119 is the same as a distance from the bottom rear coil element 101B to the optical axis 119.

In some embodiments, the positions of the top front coil element 103A and the bottom front coil element 103B are symmetric with respect to the optical axis 119. For example, a distance from the top front coil element 103A to the optical axis 119 is the same as a distance from the bottom front coil element 103B to the optical axis 119.

In the example shown in FIG. 1C, the top magnetic element 113 and the bottom magnetic element 115 are positioned under the top rear coil element 101A and the top front coil element 103A. The top magnetic element 113 and the bottom magnetic element 115 are also positioned above the bottom rear coil element 101B and the bottom front coil element 103B. In some embodiments, the top rear coil element 101A, the top front coil element 103A, the bottom rear coil element 101B, and/or the bottom rear coil element 101B may generate magnetic fields that attract the top magnetic element 113 and the bottom magnetic element 115 and cause the top magnetic element 113 and the bottom magnetic element 115 to move between the front coil magnetic axis 109 and the rear coil magnetic axis 107.

For example, the top front coil element 103A may generate a magnetic field that exerts a front magnetic force to attract the top magnetic element 113 to a front end of the example variable focusing lens apparatus 100, and the top rear coil element 101A may generate a magnetic field that exerts a rear magnetic force to attract the top magnetic element 113 to a rear end of the example variable focusing lens apparatus 100. In some embodiments, the movement of the top magnetic element 113 may correlate to the strength difference between front magnetic force and the rear magnetic force. As described above, the strength of the front magnetic force correlates to the amount of the front coil current in the top front coil element 103A, and the strength of the rear magnetic force correlates to the amount of the rear coil current in the top rear coil element 101A. As such, the movement of the top magnetic element 113 may correlate to a current differential ratio associated with the front coil current and the rear coil current, details of which are described herein.

Additionally, or alternatively, the bottom front coil element 103B may generate a magnetic field that exerts a front magnetic force to attract the bottom magnetic element 115 to the front end of the example variable focusing lens apparatus 100, and the bottom rear coil element 101B may generate a magnetic field that exerts a rear magnetic force to attract the bottom magnetic element 115 to the rear end of the example variable focusing lens apparatus 100. In some embodiments, the movement of the bottom magnetic element 115 may correlate to the strength difference between front magnetic force and the rear magnetic force. As described above, the strength of the front magnetic force correlates to the amount of the front coil current in the bottom front coil element 103B, and the strength of the rear magnetic force correlates to the amount of the rear coil current in the bottom rear coil element 101B. As such, the movement of the bottom magnetic element 115 may correlate to the current differential ratio associated with the front coil current and the rear coil current, details of which are described herein.

As described above, the top magnetic element 113 and the bottom magnetic element 115 are secured to the barrel lens assembly 111. As such, when the top magnetic element 113 and/or the bottom magnetic element 115 moves, the barrel lens assembly 111 moves together with the top magnetic element 113 and/or the bottom magnetic element 115. In some embodiments, the movement positions of the barrel lens assembly 111 correlates to the current differential ratio associated with the front coil current and the rear coil current, details of which are described herein.

In some embodiments, the movements of the barrel lens assembly 111 may be facilitated by one or more bearing balls. As shown in FIG. 1D, a plurality of moving balls are positioned between the outer surface of the barrel lens assembly 111 and the inner surface of the module holder 135.

In particular, the barrel lens assembly 111 comprises at least one bearing ball holding portion (for example, the bearing ball holding portion 149 and the bearing ball holding portion 161) disposed on an outer surface of the barrel lens assembly 111. In particular, the at least one bearing ball holding portion (for example, the bearing ball holding portion 149 and the bearing ball holding portion 161) is a portion of the outer surface of the barrel lens assembly 111 that is sunken from its surrounding portions on the outer surface and/or defines surface where a bearing ball may be positioned. In the example shown in FIG. 1D, the at least one bearing ball holding portion (for example, the bearing ball holding portion 149 and the bearing ball holding portion 161) is in the form of a groove that is along an edge of the outer surface of the barrel lens assembly 111.

As described above, at least one bearing ball is positioned on the at least one bearing ball holding portion. In the example shown in FIG. 1D, at least one bearing ball 151 is positioned on the bearing ball holding portion 149, and at least one bearing ball 163 is positioned on the bearing ball holding portion 161.

In some embodiments, the barrel lens assembly 111 may comprise more than one bearing ball holding portion. In the example shown in FIG. 1D, the barrel lens assembly 111 comprises four bearing ball holding portions that are located at the four front outer edges of the barrel lens assembly 111 (including a front top left edge, a front top right edge, a front bottom left edge, and a front bottom right edge), and four bearing ball holding portions that are located at the four rear outer edges of the barrel lens assembly 111 (including a rear top left edge, a rear top right edge, a rear bottom left edge, and a rear bottom right edge). While FIG. 1D illustrates an example of eight bearing ball holding portions, it is noted that the scope of the present disclosure is not limited to the description above. In some examples, an example barrel lens assembly 111 may comprise less than eight or more than eight bearing ball holding portions.

Further, as shown in FIG. 1D, the module holder 135 comprises at least one bearing ball moving rail 147 disposed on an inner surface of the module holder 135. In particular, the at least one bearing ball moving rail 147 is a portion of the inner surface of the module holder 135 that is sunken from its surrounding portions on the inner surface and/or defines a rail where a bearing ball may move. In the example shown in FIG. 1D, the at least one bearing ball moving rail 147 is in the form of a groove that is along an edge of the inner surface of the module holder 135.

In some embodiments, the module holder 135 may comprise more than one bearing ball moving rail. For example, the module holder 135 comprises four bearing ball moving rails that are located at the four inner edges within the module holder 135 (including a top left edge, a top right edge, a bottom left edge, and a bottom right edge). Additionally, or alternatively, an example barrel lens assembly 111 may comprise less than four or more than four bearing ball moving rails.

As described above, the module holder 135 may house the barrel lens assembly 111. In some embodiments, when the barrel lens assembly 111 is positioned with the module holder 135, the at least one bearing ball holding portion of the barrel lens assembly 111 mates with the at least one bearing ball moving rail of the module holder 135, so that the at least one bearing ball holding portion and the at least one bearing ball moving rail define a space where the at least one bearing ball may be stored, rotate, and move. For example, the at least one bearing ball is moveable along the at least one bearing ball moving rail. As such, the barrel lens assembly 111 is movable within the module holder 135 as the at least one bearing ball moves along the at least one bearing ball moving rail.

As described above, the top magnetic element 113 may be attracted by the front magnetic force of the magnetic field generated by the top front coil element 103A. Because the top magnetic element 113 is secured to the barrel lens assembly 111, the front magnetic force also causes the barrel lens assembly 111 to move to the front end of the example variable focusing lens apparatus 100. Because the at least one bearing ball is positioned between the outer surface of the barrel lens assembly 111 and the inner surface of the module holder 135, the at least one bearing ball separates the barrel lens assembly 111 from the module holder 135 while allowing the barrel lens assembly 111 to move to a front end of the module holder 135.

Similarly, as described above, the top magnetic element 113 may be attracted by the rear magnetic force of the magnetic field generated by the top rear coil element 101A. Because the top magnetic element 113 is secured to the barrel lens assembly 111, the rear magnetic force also causes the barrel lens assembly 111 to move to the rear end of the example variable focusing lens apparatus 100. Because the at least one bearing ball is positioned between the outer surface of the barrel lens assembly 111 and the inner surface of the module holder 135, the at least one bearing ball separates the barrel lens assembly 111 from the module holder 135 while allowing the barrel lens assembly 111 to move to a rear end of the module holder 135.

In the example shown in FIG. 1D, the dual coil board 105 may define/comprise a dual coil board opening 171 that is positioned at the center of the dual coil board 105. In some embodiments, the dual coil board opening 171 may be in a shape similar to a circular shape. In some embodiments, the center of the dual coil board opening 171 overlaps with the center of the dual coil board 105.

In some embodiments, when example variable focusing lens apparatus 100 is assembled, the front stop nut central opening 143, the module holder central opening 137, the holder cover central opening 125, the rear stop nut central opening 131, and the dual coil board opening 171 are aligned with one another. For example, the central axis of the front stop nut central opening 143, the central axis of the module holder central opening 137, the central axis of the holder cover central opening 125, the central axis of the rear stop nut central opening 131 and the central axis of the dual coil board opening 171 may be aligned with the optical axis of the barrel lens assembly 111, such that light may enter the barrel lens assembly 111 after traveling through the front stop nut central opening 143 and the module holder central opening 137, and may exit the barrel lens assembly 111 and travel through the holder cover central opening 125, the rear stop nut central opening 131, and the dual coil board opening 171 (for example, before arriving at an imaging sensor).

In some embodiments, the barrel lens assembly 111 may define a focal point on the optical axis where the light may meet after traveling through the barrel lens assembly 111. In some embodiments, a sensing area of the imaging sensor may be aligned to the dual coil board opening 171 to capture image data. In some embodiments, the barrel lens assembly 111 may be moved to a suitable barrel lens assembly position along the optical axis so that the location of the focal point of the barrel lens assembly 111 is at the sensing area of the imaging sensor and the image captured by the imaging sensor is in focus. Example methods of causing the barrel lens assembly 111 to move to different barrel lens assembly positions are described herein.

Figure 1E:
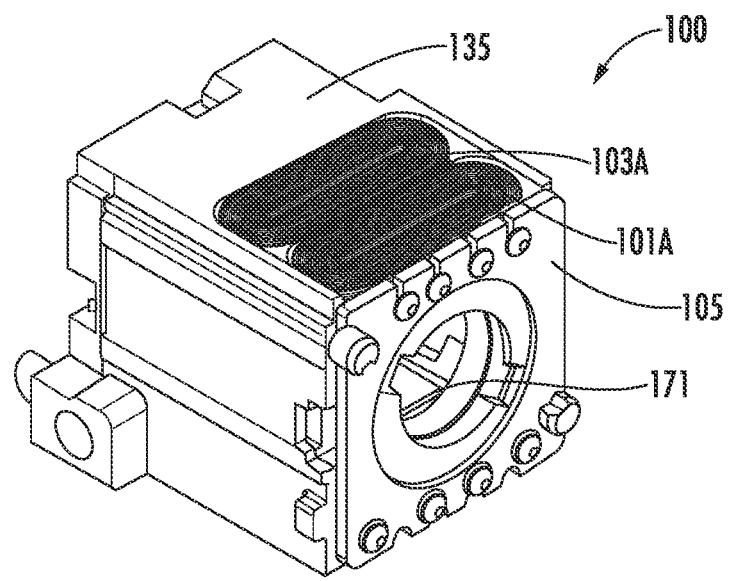
FIG. 1E illustrates an example rear perspective view of the example variable focusing lens apparatus shown in FIG. 1A in accordance with various embodiments of the present disclosure.

Referring now to FIG. 1E, an example rear perspective view of the example variable focusing lens apparatus 100 is illustrated. For example, FIG. 1E illustrates that the example dual coil board opening 171 is positioned at the center of the dual coil board 105. FIG. 1E also illustrates that the top rear coil element 101A and the top front coil element 103A are positioned along the top surface of the module holder 135.

Figure 1F:
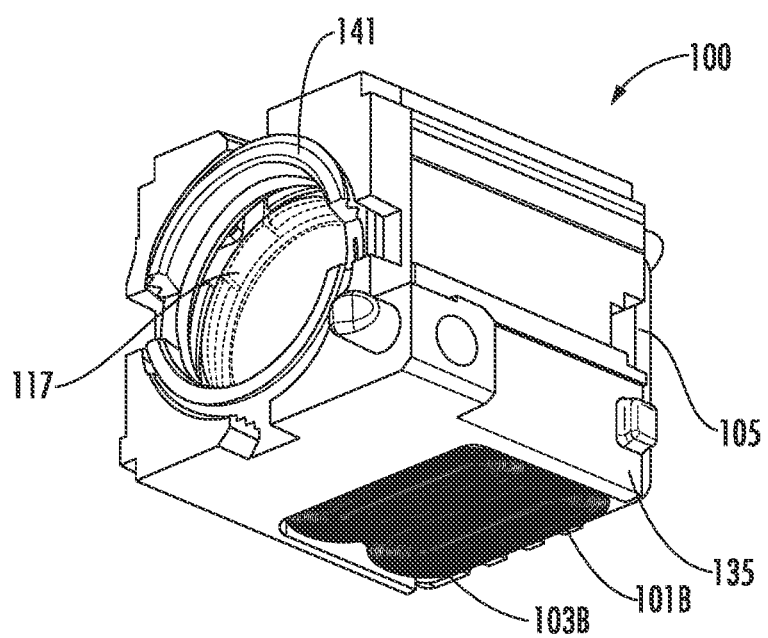
FIG. 1F illustrates an example bottom perspective view of the example variable focusing lens apparatus shown in FIG. 1A in accordance with various embodiments of the present disclosure.

Referring now to FIG. 1F, an example bottom perspective view of the example variable focusing lens apparatus 100 is illustrated. For example, FIG. 1F illustrates that the bottom rear coil element 101B and the bottom front coil element 103B are positioned along the bottom surface of the module holder 135.

Figure 1G:
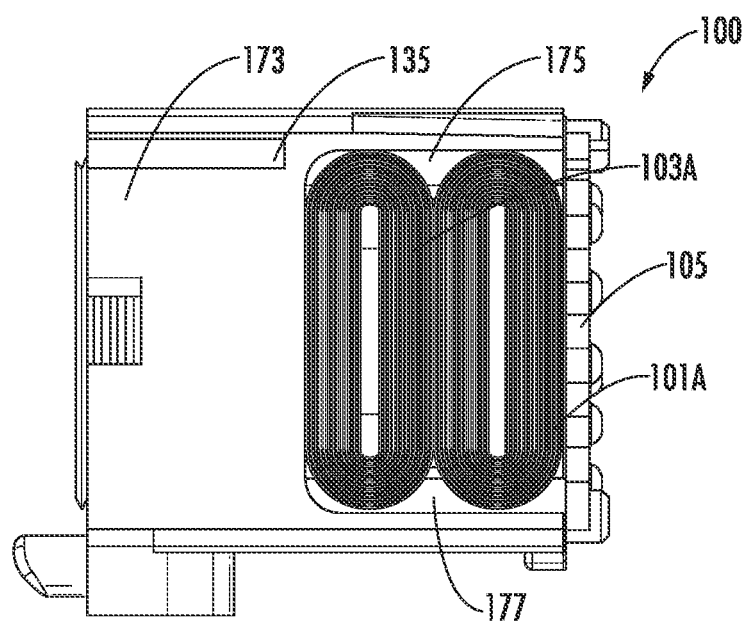
FIG. 1G illustrates an example top view of the example variable focusing lens apparatus shown in FIG. 1A in accordance with various embodiments of the present disclosure.

Referring now to FIG. 1G, an example top view of the example variable focusing lens apparatus 100 is illustrated.

In some embodiments, the module holder 135 may comprise a top wall 173. In some embodiments, the top wall 173 may comprise one or more recessed edges. In the example shown in FIG. 1G, the top wall 173 may comprise a left top recessed edge 175 and a right top recessed edge 177. In some embodiments, each of the left top recessed edge 175 and the right top recessed edge 177 defines a recessed edge surface that is recessed from the outer surface of top wall 173 of the module holder 135. In some embodiments, the portion of the top wall 173 between the left top recessed edge 175 and the right top recessed edge 177 is removed, such that the left top recessed edge 175 and the right top recessed edge 177 define a magnetization opening. In some embodiments, the top rear coil element 101A and the top front coil element 103A are positioned on/supported by the left top recessed edge 175 and the right top recessed edge 177. As described above, the top rear coil element 101A and the top front coil element 103A may each generate a magnetic field, which may pass through the magnetization opening and exert magnetic force on the top magnetic element. Additional details associated with the module holder 135 are described herein, including, but not limited to, those described in connection with at least FIG. 3A to FIG. 3F.

Figure 1H:
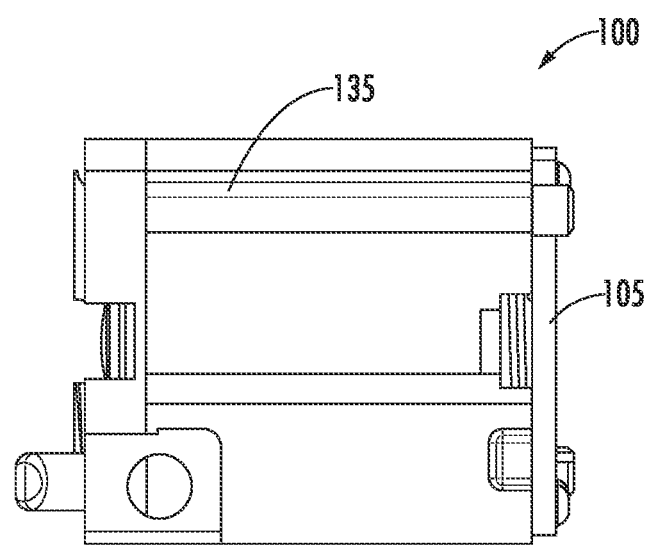
FIG. 1H illustrates an example side view of the example variable focusing lens apparatus shown in FIG. 1A in accordance with various embodiments of the present disclosure.

Referring now to FIG. 1H, an example side view of the example variable focusing lens apparatus 100 is illustrated. As shown in FIG. 1H, the dual coil board 105 is secured to the module holder 135.

Referring now to FIG. 2A to FIG. 2F, example views associated with an example barrel lens assembly 200 in accordance with some embodiments of the present disclosure are illustrated.

Figure 2A:
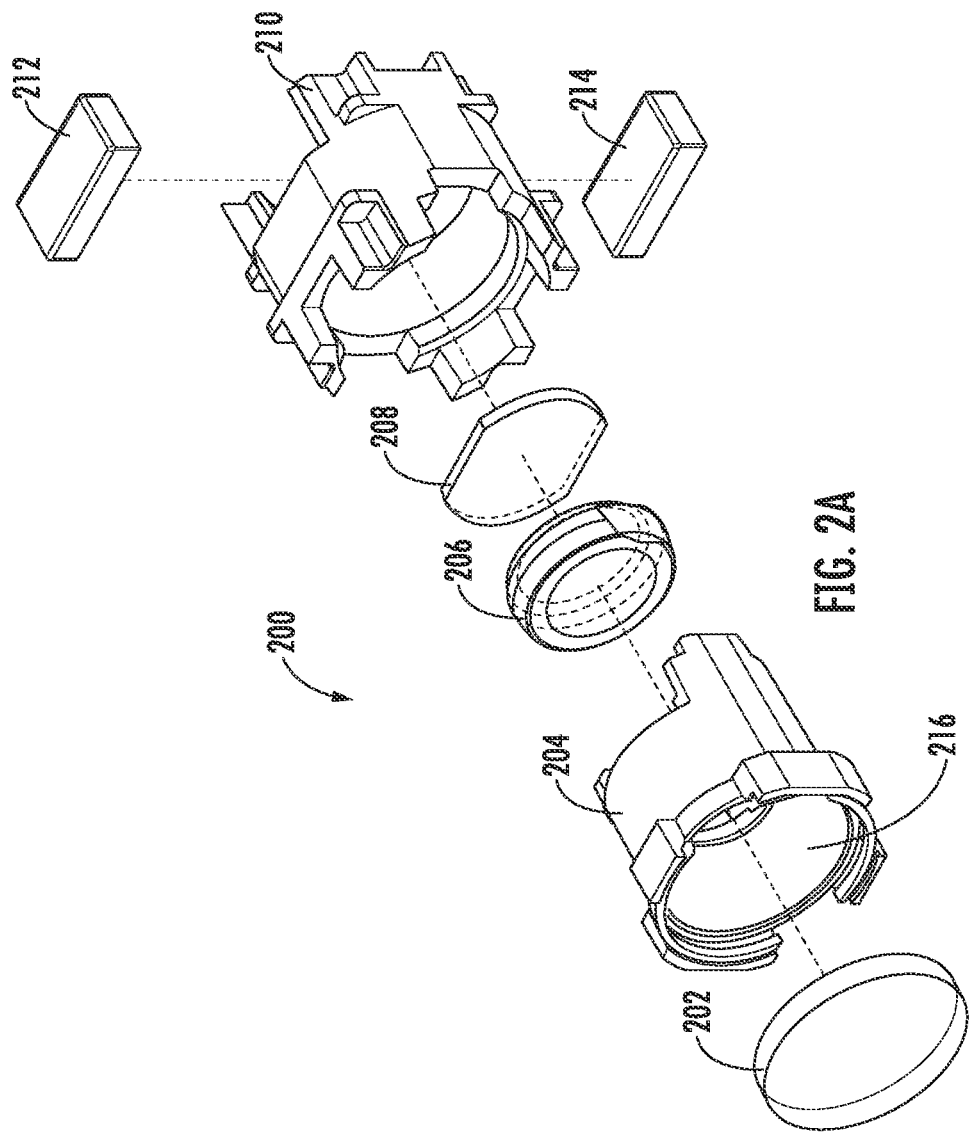
FIG. 2A illustrates an example exploded view of an example barrel lens assembly in accordance with some embodiments of the present disclosure.

In particular, FIG. 2A illustrates an example exploded view of the example barrel lens assembly 200. In the example shown in FIG. 2A, the example barrel lens assembly 200 may comprise one or more optical elements (such as, but not limited to, a first lens element 202, a second lens element 206, an infrared (IR) cut filter 208), a lens aperture 204, a lens barrel 210, and one or more magnetic elements (such as, but not limited to, a top magnetic element 212 and a bottom magnetic element 214).

Similar to those described above, the lens aperture 204 and/or the lens barrel 210 define/comprise one or more aperture holes, aperture openings, and/or aperture structures where light can travel through. In some embodiments, the one or more optical components of the example barrel lens assembly 200 may be positioned within the aperture holes, aperture openings, and/or aperture structures that are defined by the lens aperture 204 and/or the lens barrel 210.

In some embodiments, the example barrel lens assembly 200 may comprise a first lens element 202, a second lens element 206, and a IR cut filter 208. In some embodiments, the first lens element 202, the second lens element 206, and the IR cut filter 208 are secured within the example barrel lens assembly 200.

For example, the first lens element 202 and the second lens element 206 are disposed/secured in the aperture opening 216 of the lens aperture 204, and the IR cut filter 208 is disposed/secured in the lens barrel 210. In some embodiments, the lens aperture 204 is positioned within the lens barrel 210. As such, the first lens element 202, the second lens element 206, and the IR cut filter 208 are secured within the lens barrel 210.

In some embodiments, light may travel through the first lens element 202, then through the second lens element 206, and then through the IR cut filter 208.

In some embodiments, the first lens element 202 may be in the form of a plano-convex lens. In some embodiments, the second lens element 206 may be in the form of a negative meniscus lens. In some embodiments, the first lens element 202 and the second lens element 206 may concentrate light entering the lens barrel 210. In some embodiments, the IR cut filter 208 may reflect or block near-infrared wavelengths while passing visible light.

While the description above provides examples of optical components positioned within the aperture opening of the lens aperture 204, it is noted that the scope of the present disclosure is not limited to the description above. In some examples, an example barrel lens assembly may include one or more optical elements for concentrating, refracting, and/or otherwise manipulating light entering the example barrel lens assembly. For example, the one or more optical elements may comprise a plurality of sub-lenses designed to manipulate, in a desired manner, the light traversing through the aperture. Additionally, or alternatively, the one or more optical elements may be designed to angle light for capture at one or more desired points, such as at a location of an associated imaging sensor. The one or more optical elements may be constructed of any number of materials, for example glass, optical plastic, and/or the like, or a combination thereof. Additionally or alternatively, the one or more optical elements may be constructed of one or more lenses embodying any number of lens designs.

In some embodiments, the example barrel lens assembly 200 may comprise a lens barrel 210. As described above, the lens aperture 204 may be positioned within the lens barrel 210. In the example shown in FIG. 2A, a top magnetic element 212 is positioned on a top of the lens barrel 210, and a bottom magnetic element 214 is positioned on a bottom of the lens barrel 210.

Figure 2B:
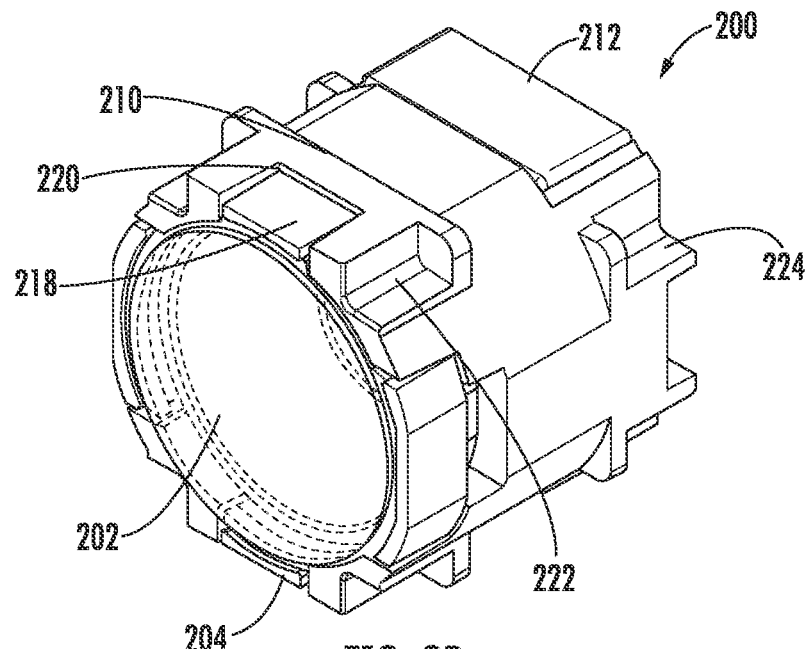
FIG. 2B illustrates an example front perspective view of the example barrel lens assembly shown in FIG. 2A in accordance with some embodiments of the present disclosure.

FIG. 2B illustrates an example front perspective view of the example barrel lens assembly 200. As shown in FIG. 2B, the lens aperture 204 may comprise one or more protrusions (for example, the protrusion 218) that are disposed on the outer surface of the lens aperture 204 and extends from the outer surface of the lens aperture 204. The lens barrel 210 may comprise one or more recessed portions (for example, the recessed portion 220). In some embodiments, the one or more protrusions of the lens aperture 204 may mate with the one or more recessed portions of the lens barrel 210, so that the lens aperture 204 can be secured within the lens barrel 210.

Further, as illustrated in FIG. 2B, the example barrel lens assembly 200 may comprise at least one bearing ball holding portion (for example but not limited to, the bearing ball holding portion 222 and the bearing ball holding portion 224) disposed on the outer surface of the lens barrel 210. Similar to those described above, each bearing ball holding portion may be in the form of a groove that is disposed along an edge of the outer surface of the lens barrel 210, and at least one bearing ball is positioned on each of the bearing ball holding portions.

Figure 2C:
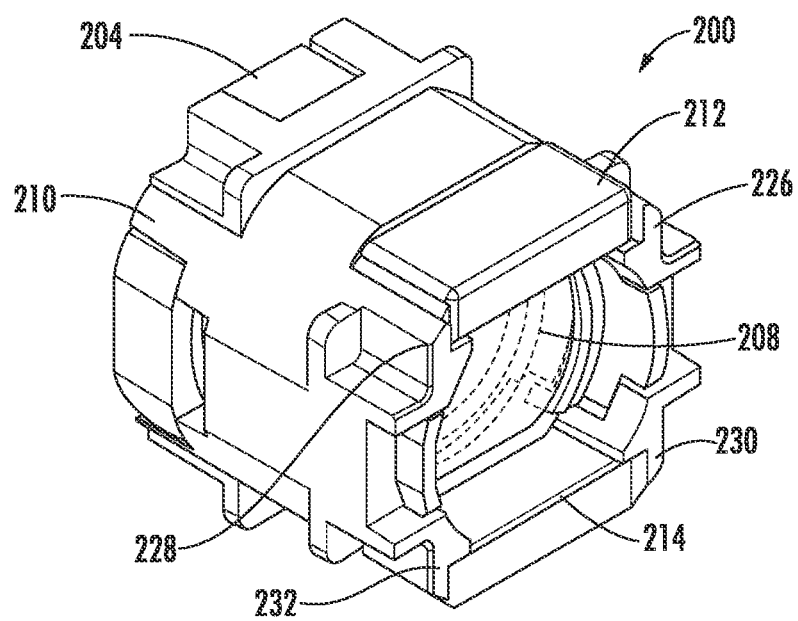
FIG. 2C illustrates an example rear perspective view of the example barrel lens assembly shown in FIG. 2A in accordance with some embodiments of the present disclosure.

FIG. 2C illustrates an example rear perspective view of the example barrel lens assembly 200.

In the example shown in FIG. 2C, the example barrel lens assembly 200 comprises a plurality of recessed edges. In some embodiments, the top magnetic element 212 and the bottom magnetic element 214 are each secured to the example barrel lens assembly 200 through support from a pair of recessed edges. For example, the example barrel lens assembly 200 may comprise a top left recessed edge 226 and a top right recessed edge 228 that are disposed on a top portion of the lens barrel 210, and the top left recessed edge 226 is in a parallel arrangement with the top right recessed edge 228. In such an example, the top magnetic element 212 may be attached to the top left recessed edge 226 and the top right recessed edge 228. Additionally, or alternatively, the example barrel lens assembly 200 may comprise a bottom right recessed edge 232 and a bottom left recessed edge 230 that are disposed on a bottom portion of the lens barrel 210, and the bottom right recessed edge 232 is in a parallel arrangement with the bottom left recessed edge 230. In such an example, the bottom magnetic element 214 may be attached to the bottom right recessed edge 232 and the bottom left recessed edge 230.

Figure 2D:
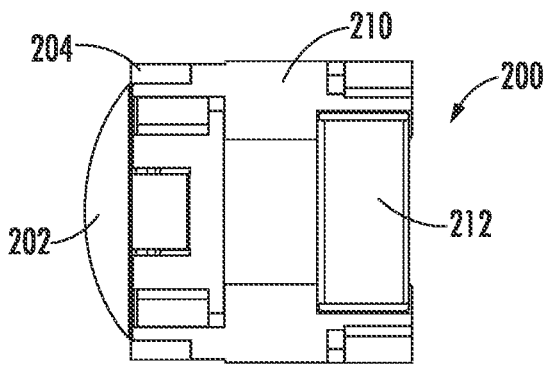
FIG. 2D illustrates an example top view of the example barrel lens assembly shown in FIG. 2A in accordance with some embodiments of the present disclosure.
Figure 2E:
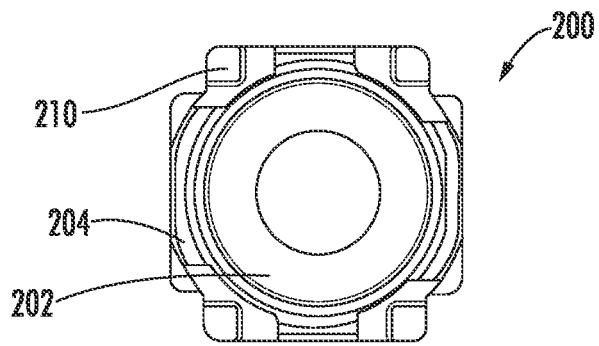
FIG. 2E illustrates an example front view of the example barrel lens assembly shown in FIG. 2A in accordance with some embodiments of the present disclosure.
Figure 2F:
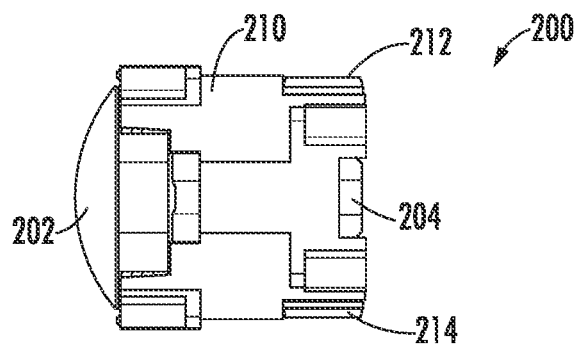
FIG. 2F illustrates an example side view of the example barrel lens assembly shown in FIG. 2A in accordance with some embodiments of the present disclosure.

Referring now to FIG. 2D to FIG. 2F, additional views of the example barrel lens assembly 200 are illustrated. In particular, FIG. 2D illustrates an example top view of the example barrel lens assembly 200, FIG. 2E illustrates an example front view of the example barrel lens assembly 200, and FIG. 2F illustrates an example side view of the example barrel lens assembly 200.

Figure 3A:
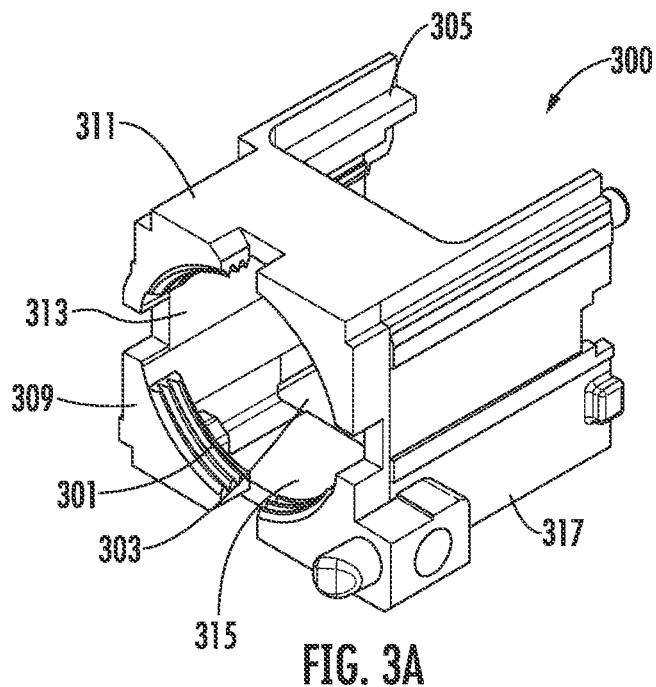
FIG. 3A illustrates an example front perspective view of an example module holder in accordance with some embodiments of the present disclosure.
Figure 3B:
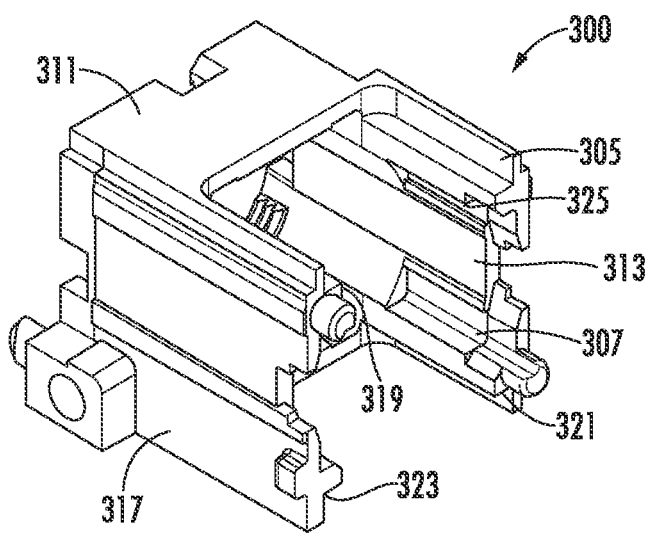
FIG. 3B illustrates an example rear perspective view of the example module holder shown in FIG. 3A in accordance with some embodiments of the present disclosure.

Referring now to FIG. 3A to FIG. 3F, example views of an example module holder 300 in accordance with some embodiments of the present disclosure are illustrated. In particular, FIG. 3A illustrates an example front perspective view of the example module holder 300. FIG. 3B illustrates an example rear perspective view of the example module holder 300.

Similar to examples of module holders described above, the example module holder 300 may define a module holder central opening 303. For example, the example module holder 300 may comprise a front wall 309 that is positioned at a front of the example module holder 300, and the module holder central opening 303 may be disposed at the center of the front wall 309.

In some embodiments, the example module holder 300 may comprise a plurality of module holder threads 301 that are disposed on an inner periphery surface of the example module holder 300, similar to those described above.

In some embodiments, the example module holder 300 may comprise a top wall 311 that is positioned at the top of the example module holder 300, a bottom wall 315 that is positioned at the bottom of the example module holder 300, a left wall 313 that is positioned at the left of the example module holder 300, and a right wall 317 that is posited at the right of the example module holder 300.

In some embodiments, a rear portion of the top wall 311 is removed, creating a top left recessed edge 305 on top of the left wall 313 and a top right recessed edge 319 on top of the right wall 317. In some embodiments, a top rear coil element and a top front coil element are disposed on/supported by the top left recessed edge 305 and the top right recessed edge 319.

Similarly, a rear portion of the bottom wall 315 is removed, creating a bottom left recessed edge 321 at the bottom of the left wall 313 and a bottom right recessed edge 323 at the bottom of the right wall 317. In some embodiments, a bottom rear coil element and a bottom front coil element are disposed on/supported by the bottom left recessed edge 321 and the bottom right recessed edge 323.

Further, as shown in FIG. 3B, the example module holder 300 may comprise one or more bearing ball moving rails on the inner surface of the module holder 300. For example, the bearing ball moving rail 307 may be defined between the inner surface of the left wall 313 and the inner surface of the bottom wall 315. Similarly, the bearing ball moving rail 325 may be defined between the inner surface of the top wall 311 and the inner surface of the left wall 313.

Figure 3C:
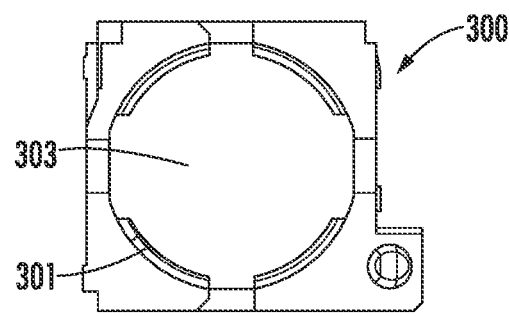
FIG. 3C illustrates an example front view of the example module holder shown in FIG. 3A in accordance with some embodiments of the present disclosure.
Figure 3D:
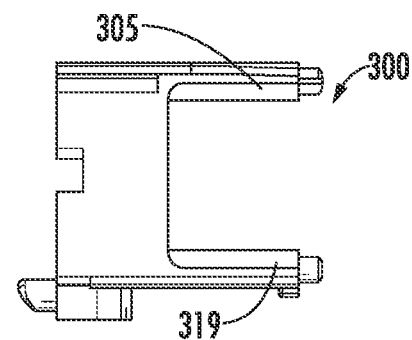
FIG. 3D illustrates an example top view of the example module holder shown in FIG. 3A in accordance with some embodiments of the present disclosure.
Figure 3E:
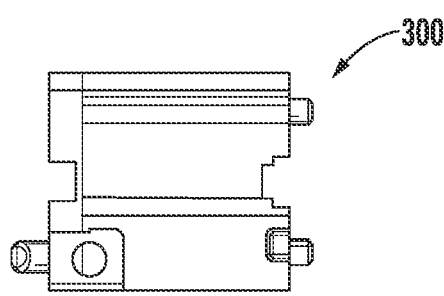
FIG. 3E illustrates an example side view of the example module holder shown in FIG. 3A in accordance with some embodiments of the present disclosure.
Figure 3F:
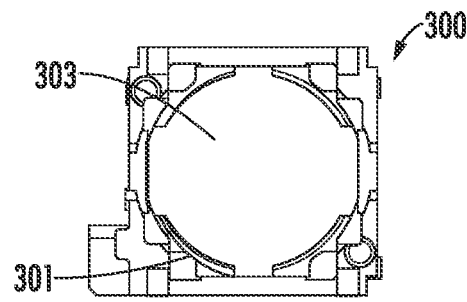
FIG. 3F illustrates an example rear view of the example module holder shown in FIG. 3A in accordance with some embodiments of the present disclosure.

Referring now to FIG. 3C to FIG. 3F, additional views of the example module holder 300 are illustrated. In particular, FIG. 3C illustrates an example front view of the example module holder 300. FIG. 3D illustrates an example top view of the example module holder 300. FIG. 3E illustrates an example side view of the example module holder 300. FIG. 3F illustrates an example rear view of the example module holder 300.

Figure 4:
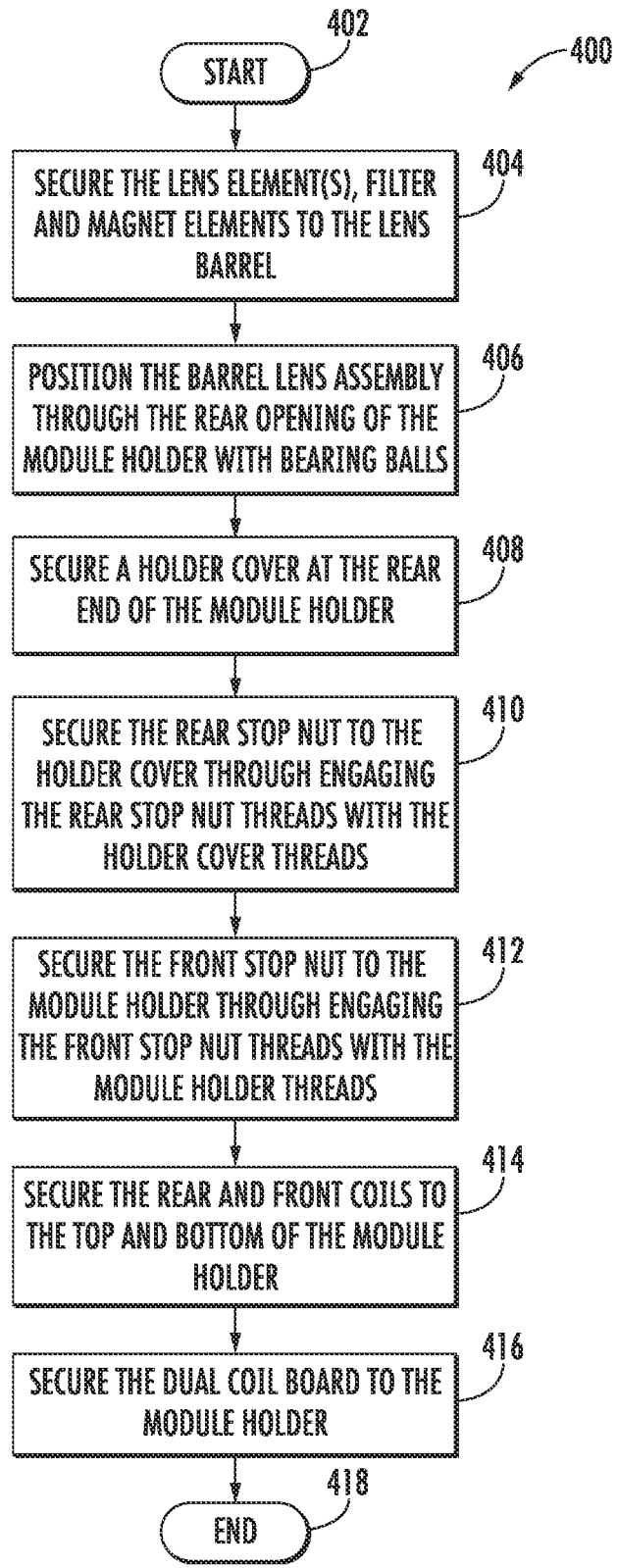
FIG. 4 illustrates an example method of assembling an example variable focusing lens apparatus in accordance with some embodiments of the present disclosure.

FIG. 4 illustrates an example method 400 of assembling an example variable focusing lens apparatus in accordance with some embodiments of the present disclosure.

Referring now to FIG. 4, the example method 400 starts at step/operation 402. In some embodiments, subsequent to step/operation 402, the example method 400 proceeds to step/operation 404. At step/operation 404, the example method 400 includes securing the lens element(s), filter and magnet elements to the lens barrel.

For example, as described above in connection with FIG. 2A, one or more optical components of the example barrel lens assembly 200 may be positioned within the aperture holes, aperture openings, and/or aperture structures that are defined by the lens aperture 204 and/or the lens barrel 210. For example, the first lens element 202, the second lens element 206, and/or the IR cut filter 208 may be secured within the lens aperture 204 and/or the lens barrel 210 through, for example, but not limited to, interference fit. Additionally, or alternatively, the first lens element 202, the second lens element 206, and/or the IR cut filter 208 may be secured within the lens aperture 204 and/or the lens barrel 210 through, for example but not limited to, chemical glues. Additionally, or alternatively, the first lens element 202, the second lens element 206, and/or the IR cut filter 208 may be secured within the lens aperture 204 and/or the lens barrel 210 through other mechanisms.

Referring back to FIG. 4, subsequent step/operation 404, the example method 400 proceeds to step/operation 406. At step/operation 406, the example method 400 includes positioning the barrel lens assembly through the rear opening of the module holder with bearing balls.

For example, as described above in connection with FIG. 1D, the module holder 135 may comprise a plurality of walls that define a rear opening. As a part of assembling the example variable focusing lens apparatus 100, the barrel lens assembly 111 may be positioned through the rear opening of the module holder 135 so that the barrel lens assembly 111 can be positioned within the module holder 135.

Further, as described above, the module holder comprises at least one bearing ball moving rail disposed on an inner surface of the module holder, and the barrel lens assembly comprises at least one bearing ball holding portion disposed on an outer surface of the barrel lens assembly. In some embodiments, assembling the example variable focusing lens apparatus comprises positioning at least one bearing ball on the at least one bearing ball holding portion of the barrel lens assembly, and mate the at least one bearing ball holding portion of the barrel lens assembly with the at least one bearing ball moving rail of the module holder, so that the barrel lens assembly is movable within the module holder as the at least one bearing ball moves along the at least one bearing ball moving rail, similar to those described above.

Referring back to FIG. 4, subsequent step/operation 406, the example method 400 proceeds to step/operation 408. At step/operation 408, the example method 400 includes securing a holder cover at the rear end of the module holder.

For example, as described above in connection with at least FIG. 1D, the module holder 135 comprises a rear end, and the holder cover 153 is secured to the rear end of the module holder 135 (for example, through chemical glue and/or mechanical locking mechanisms). As described above, the barrel lens assembly is positioned within the module holder. As such, after the holder cover is secured at the rear end of the module holder, the barrel lens assembly (along with the bearing balls) is positioned in front of the holder cover.

Referring back to FIG. 4, subsequent step/operation 408, the example method 400 proceeds to step/operation 410. At step/operation 410, the example method 400 includes securing the rear stop nut to the holder cover through engaging the rear stop nut threads with the holder cover threads.

As described above, the holder cover may comprise a plurality of holder cover threads disposed on the inner periphery surface of the holder cover. For example, the plurality of holder cover threads may be in the form of internal threads (e.g. female threads) that are on the inside of the holder cover.

The rear stop nut may comprise a plurality of rear stop nut threads that are disposed on the outer periphery surface of the rear stop nut. For example, the plurality of rear stop nut threads may be in the form of external threads (e.g. male threads) that are on the outer surface of the rear stop nut. As such, through engaging the plurality of holder cover threads of the holder cover with the plurality of rear stop nut threads of the rear stop nut, the rear stop nut can be secured to the holder cover.

In some embodiments, the position of the rear stop nut is adjustable based on the amount of mating of the plurality of holder cover threads and the plurality of rear stop nut threads.

Referring back to FIG. 4, subsequent step/operation 410, the example method 400 proceeds to step/operation 412. At step/operation 412, the example method 400 includes securing the front stop nut to the module holder through engaging the front stop nut threads with the module holder threads.

As described above, the module holder may comprise a plurality of module holder threads that are disposed on the inner periphery surface of the module holder. For example, the plurality of module holder threads may be in the form of internal threads (e.g. female threads) that are on the inside of the module holder.

The front stop nut may comprise a plurality of front stop nut threads that are disposed on the outer periphery surface of the front stop nut. For example, the plurality of front stop nut threads may be in the form of external threads (e.g. male threads) that are on the outer surface of the front stop nut. As such, through engaging the front stop nut threads with the module holder threads, the front stop nut can be secured to the module holder.

In some embodiments, the position of the front stop nut is adjustable based on the amount of mating of the plurality of module holder threads and the plurality of front stop nut threads.

Referring back to FIG. 4, subsequent step/operation 412, the example method 400 proceeds to step/operation 414. At step/operation 414, the example method 400 includes securing the rear and front coils to the top and bottom of the module holder.

For example, as described above in connection with FIG. 1D, the rear pair of coil elements 101 comprises a top rear coil element 101A and a bottom rear coil element 101B, and the front pair of coil elements 103 comprises a top front coil element 103A and a bottom front coil element 103B. In some embodiments, assembling the example variable focusing lens apparatus 100 may comprise securing the top rear coil element 101A and the top front coil element 103A to a top portion of the module holder 135, and securing the bottom rear coil element 101B and the bottom front coil element 103B to a bottom portion of the module holder 135.

For example, as described above in connection with at least FIG. 1G and FIG. 3A to FIG. 3F, the top front coil element and the top rear coil element may be secured to the top portion of the module holder between the top left recessed edge and the top right recessed edge, and the bottom front coil element and the bottom rear coil element may be secured to the bottom portion of the module holder between the bottom left recessed edge and the bottom right recessed edge.

Referring back to FIG. 4, subsequent step/operation 414, the example method 400 proceeds to step/operation 416. At step/operation 416, the example method 400 includes securing the dual coil board to the module holder.

For example, the example method 400 may secure the rear portion of the module holder to the front surface of the dual coil board through screws. Additionally, or alternatively, the example method 400 may secure the rear portion of the module holder to the front surface of the dual coil board through other means (such as, but not limited to, chemical glues).

As described above in connection with step/operation 406, the barrel lens assembly is positioned within the module holder. As such, the barrel lens assembly may be positioned within the housing defined by the module holder and the dual coil board. For example, the barrel lens assembly may be positioned between the front stop nut and the rear stop nut, similar to those described above.

Referring back to FIG. 4, subsequent step/operation 416, the example method 400 proceeds to step/operation 418 and ends.

Figure 5:
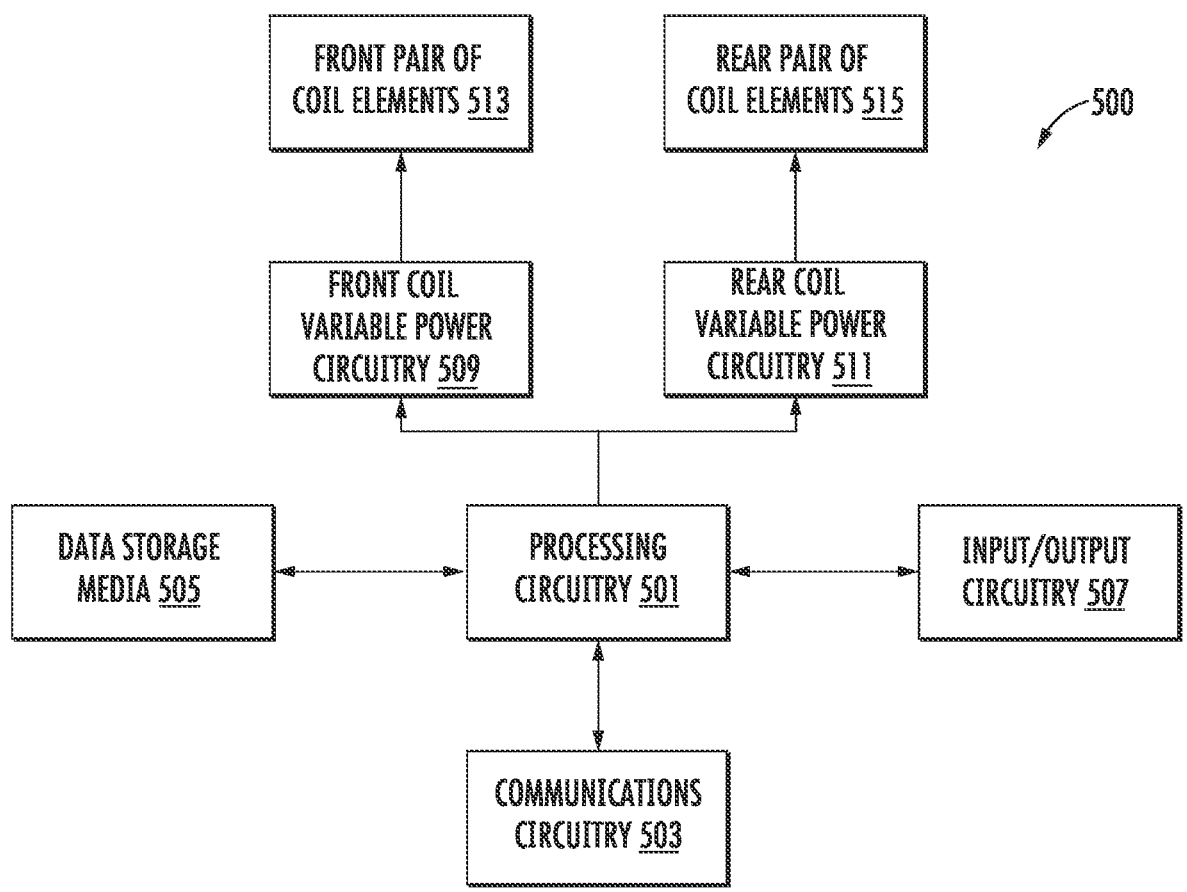
FIG. 5 illustrates an example block diagram showing example components associated with an example variable focusing lens apparatus in accordance with some embodiments of the present disclosure.

FIG. 5 illustrates an example block diagram showing example components associated with an example variable focusing lens apparatus 500 in accordance with some embodiments of the present disclosure.

In the example shown in FIG. 5, the example variable focusing lens apparatus 500 may include a processing circuitry 501, a data storage media 505, a communications circuitry 503, and an input/output circuitry 507. Additionally, the example variable focusing lens apparatus 500 may comprise a front coil variable power circuitry 509 that is electronically coupled to the front pair of coil elements 513 and provides a front coil current to the front pair of coil elements 513. Additionally, the example variable focusing lens apparatus 500 may comprise a rear coil variable power circuitry 511 that is electronically coupled to the rear pair of coil elements 515 and provides a rear coil current to the rear pair of coil elements 515.

In accordance with some embodiments of the present disclosure, the example variable focusing lens apparatus 500 may be configured to execute the operations described herein. Although the components are described with respect to functional limitations, it should be understood that the particular implementations necessarily include the use of particular hardware. It should also be understood that certain of the components described herein may include similar or common hardware. For example, two sets of circuitries may both leverage use of the same processor, network interface, storage medium, or the like to perform their associated functions, such that duplicate hardware is not required for each set of circuitries.

In some embodiments, the processing circuitry 501 (and/or co-processor or any other processing circuitry assisting or otherwise associated with the processor) may be in communication with the data storage media 505 via a bus for passing information among components of the apparatus. The data storage media 505 may be non-transitory and may include, for example, one or more volatile and/or non-volatile memories. In other words, for example, the data storage media 505 may be an electronic storage device (e.g., a computer readable storage medium). The data storage media 505 may be configured to store information, data, content, applications, instructions, or the like, for enabling the example variable focusing lens apparatus 500 to carry out various functions in accordance with example embodiments of the present disclosure.

The processing circuitry 501 may be embodied in a number of different ways and may, for example, include one or more processing devices configured to perform independently. For example, the processing circuitry 501 may be embodied as one or more complex programmable logic devices (CPLDs), microprocessors, multi-core processors, co-processing entities, application-specific instruction-set processors (ASIPs), and/or controllers. Further, the processing circuitry 501 may be embodied as one or more other processing devices or circuitry. The term circuitry may refer to an entirely hardware embodiment or a combination of hardware and computer program products. Thus, the processing circuitry 501 may be embodied as integrated circuits, application specific integrated circuits (ASICs), field programmable gate arrays (FPGAs), programmable logic arrays (PLAs), hardware accelerators, other circuitry, and/or the like.

In an example embodiment, the processing circuitry 501 may be configured to execute instructions stored in the data storage media 505 or otherwise accessible to the processing circuitry 501. Alternatively, or additionally, the processing circuitry 501 may be configured to execute hard-coded functionality. As such, whether configured by hardware or software methods, or by a combination thereof, the processing circuitry 501 may represent an entity (e.g., physically embodied in circuitry) capable of performing operations according to an embodiment of the present disclosure while configured accordingly. Alternatively, as another example, when the processing circuitry 501 is embodied as an executor of software instructions, the instructions may specifically configure the processor to perform the algorithms and/or operations described herein when the instructions are executed.

In some embodiments, the example variable focusing lens apparatus 500 may include the input/output circuitry 507 that may, in turn, be in communication with the processing circuitry 501 to provide output to the user and, in some embodiments, to receive an indication of a user input. The input/output circuitry 507 may comprise an interface, a mobile application, a kiosk, or the like. In some embodiments, the input/output circuitry 507 may also include a keyboard, a mouse, a joystick, a touch screen, touch areas, soft keys, a microphone, a speaker, or other input/output mechanisms.

In some embodiments, the input/output circuitry 507 may include a display that may, in turn, be in communication with the processing circuitry 501 to display renderings of user interfaces. In various examples of the present disclosure, the display may include a liquid crystal display (LCD), a light-emitting diode (LED) display, a plasma (PDP) display, a quantum dot (QLED) display, and/or the like.

The communications circuitry 503 may be any means such as a device or circuitry embodied in either hardware or a combination of hardware and software that is configured to receive and/or transmit data from/to a network and/or any other device, circuitry, or module in communication with the example variable focusing lens apparatus 500. In this regard, the communications circuitry 503 may include, for example, a network interface for enabling communications with a wired or wireless communication network. For example, the communications circuitry 503 may include one or more network interface cards, antennae, buses, switches, routers, modems, and supporting hardware and/or software, or any other device suitable for enabling communications via a network. Additionally, or alternatively, the communication interface may include the circuitry for interacting with the antenna(s) to cause transmission of signals via the antenna(s) or to handle receipt of signals received via the antenna(s).

It is also noted that all or some of the information discussed herein can be based on data that is received, generated and/or maintained by one or more components of example variable focusing lens apparatus 500. In some embodiments, one or more external systems (such as a remote computing and/or data storage system) may also be leveraged to provide at least some of the functionality discussed herein.

In the example shown in FIG. 5, the example variable focusing lens apparatus 500 may comprise a front coil variable power circuitry 509 connected to the front pair of coil elements 513. In some embodiments, the front coil variable power circuitry 509 may provide an adjustable current to the front pair of coil elements 513. For example, the front coil variable power circuitry 509 may be in the form of an adjustable current regulator that is coupled to a power source (for example, a direct current (DC) current source). Additionally, or alternatively, the front coil variable power circuitry 509 may be in the form of a variable resistor that is coupled to the power source. Additionally, or alternatively, the front coil variable power circuitry 509 may be in other forms.

In some embodiments, the processing circuitry 501 may transmit control instructions to the front coil variable power circuitry 509 to set the value of the front coil current in the front pair of coil elements 513. For example, the control instructions may comprise a value for the front coil current. In some embodiments, in response to receiving the control instructions, the front coil variable power circuitry 509 may adjust the front coil current that flows in the front pair of coil elements 513 based on the value for the front coil current indicated in the control instructions.

Similarly, the example variable focusing lens apparatus 500 may comprise a rear coil variable power circuitry 511 connected to the rear pair of coil elements 515. In some embodiments, the rear coil variable power circuitry 511 may provide an adjustable current to the rear pair of coil elements 515. For example, the rear coil variable power circuitry 511 may be in the form of an adjustable current regulator that is coupled to a power source (for example, a direct current (DC) current source). Additionally, or alternatively, the rear coil variable power circuitry 511 may be in the form of a variable resistor that is coupled to the power source. Additionally, or alternatively, the rear coil variable power circuitry 511 may be in other forms.

In some embodiments, the processing circuitry 501 may transmit control instructions to the rear coil variable power circuitry 511 to set the value of the rear coil current in the rear pair of coil elements 515. For example, the control instructions may comprise a value for the rear coil current. In some embodiments, in response to receiving the control instructions, the rear coil variable power circuitry 511 may adjust the rear coil current that flows in the rear pair of coil elements 515 based on the value for the rear coil current indicated in the control instructions.

As such, the processing circuitry 501 may control the amount of the front coil current that powers the front pair of coil elements and the amount of the rear coil current that powers the rear pair of coil elements. In some embodiments, the processing circuitry 501 may cause the barrel lens assembly to move to a plurality of barrel lens assembly positions through current setting (e.g. setting the front coil current and the rear coil current), details of which are described herein.

Figure 6A:
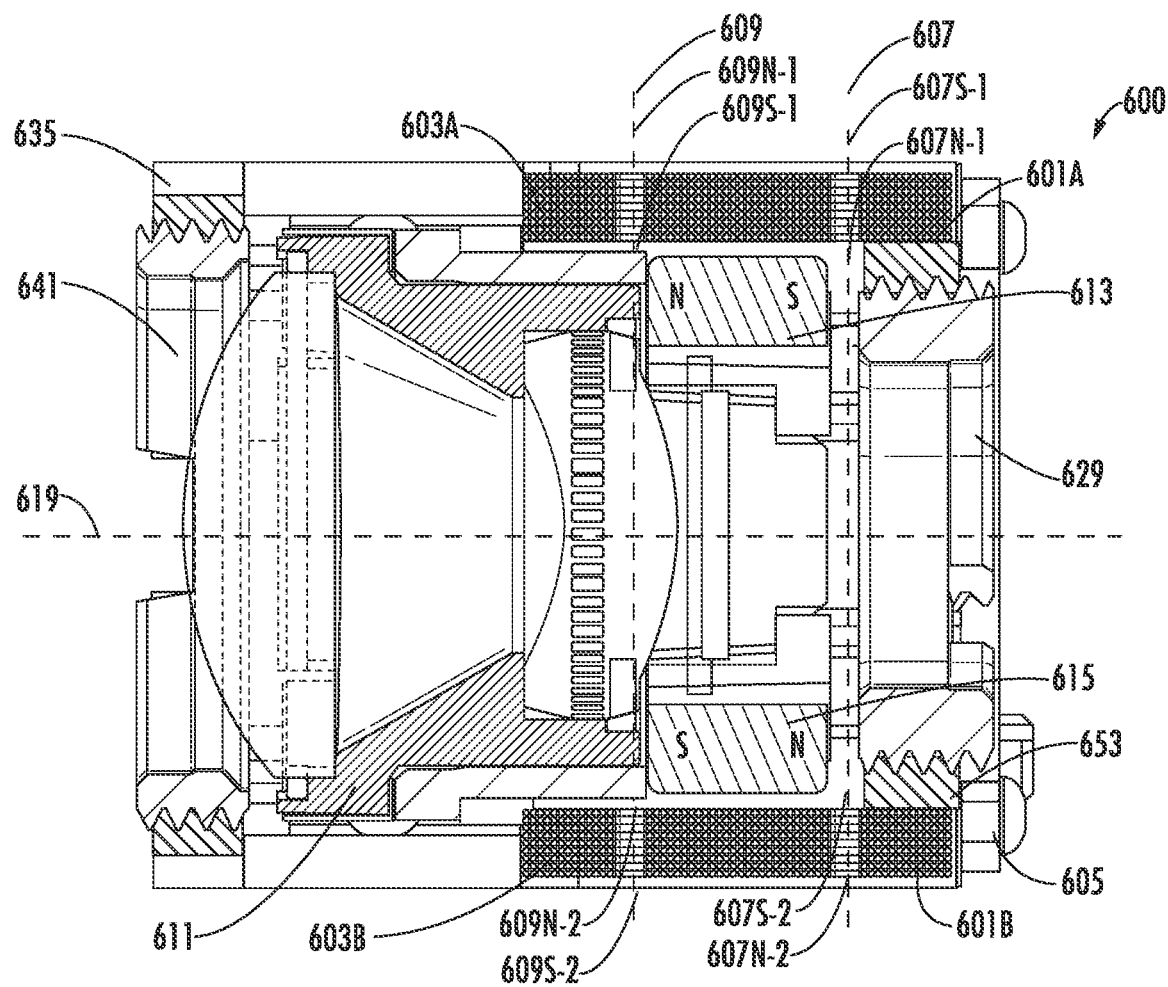
FIG. 6A illustrates an example barrel lens assembly position of an example barrel lens assembly within an example variable focusing lens apparatus in accordance with some embodiments of the present disclosure.
Figure 6B:
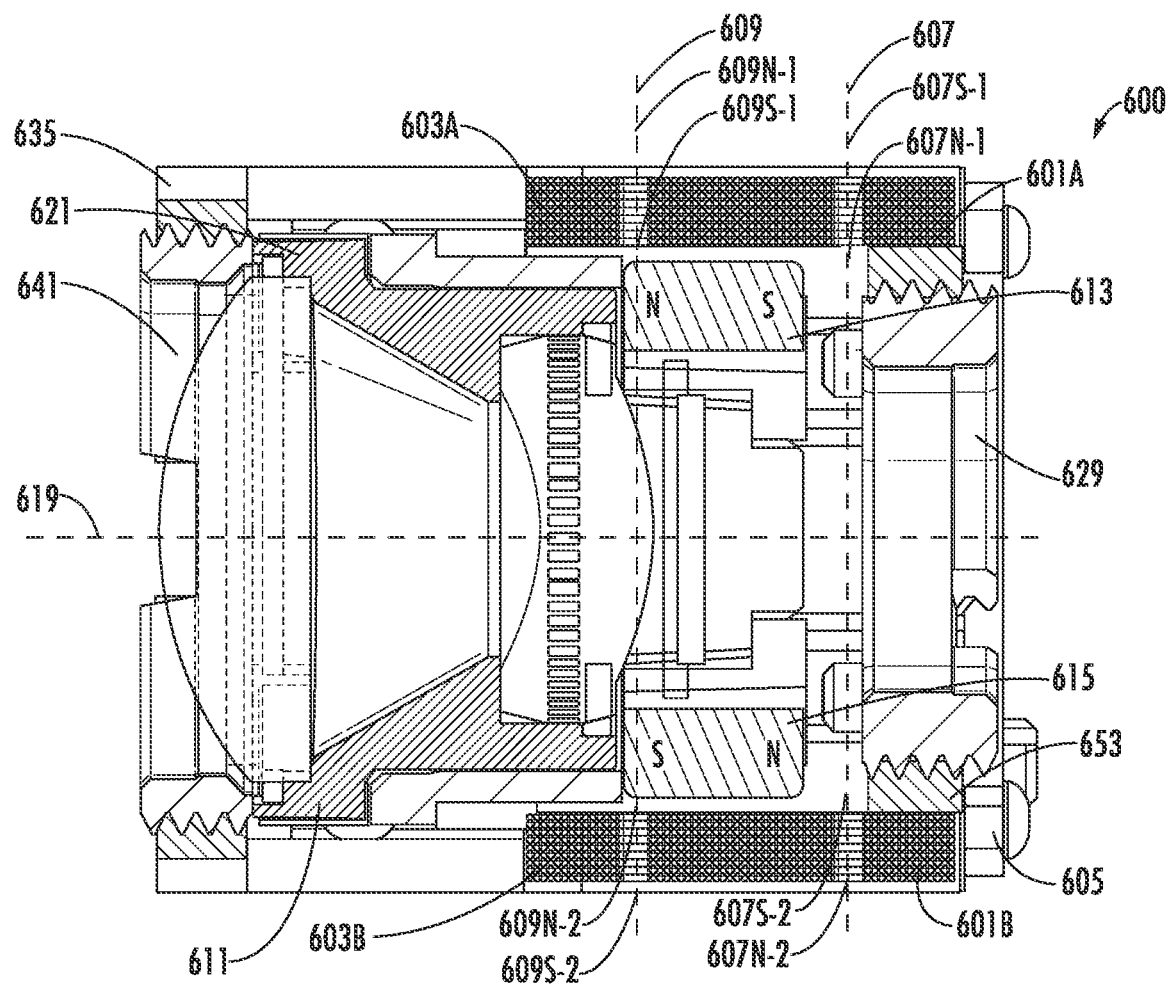
FIG. 6B illustrates another example barrel lens assembly position of an example barrel lens assembly within an example variable focusing lens apparatus in accordance with some embodiments of the present disclosure.
Figure 6C:
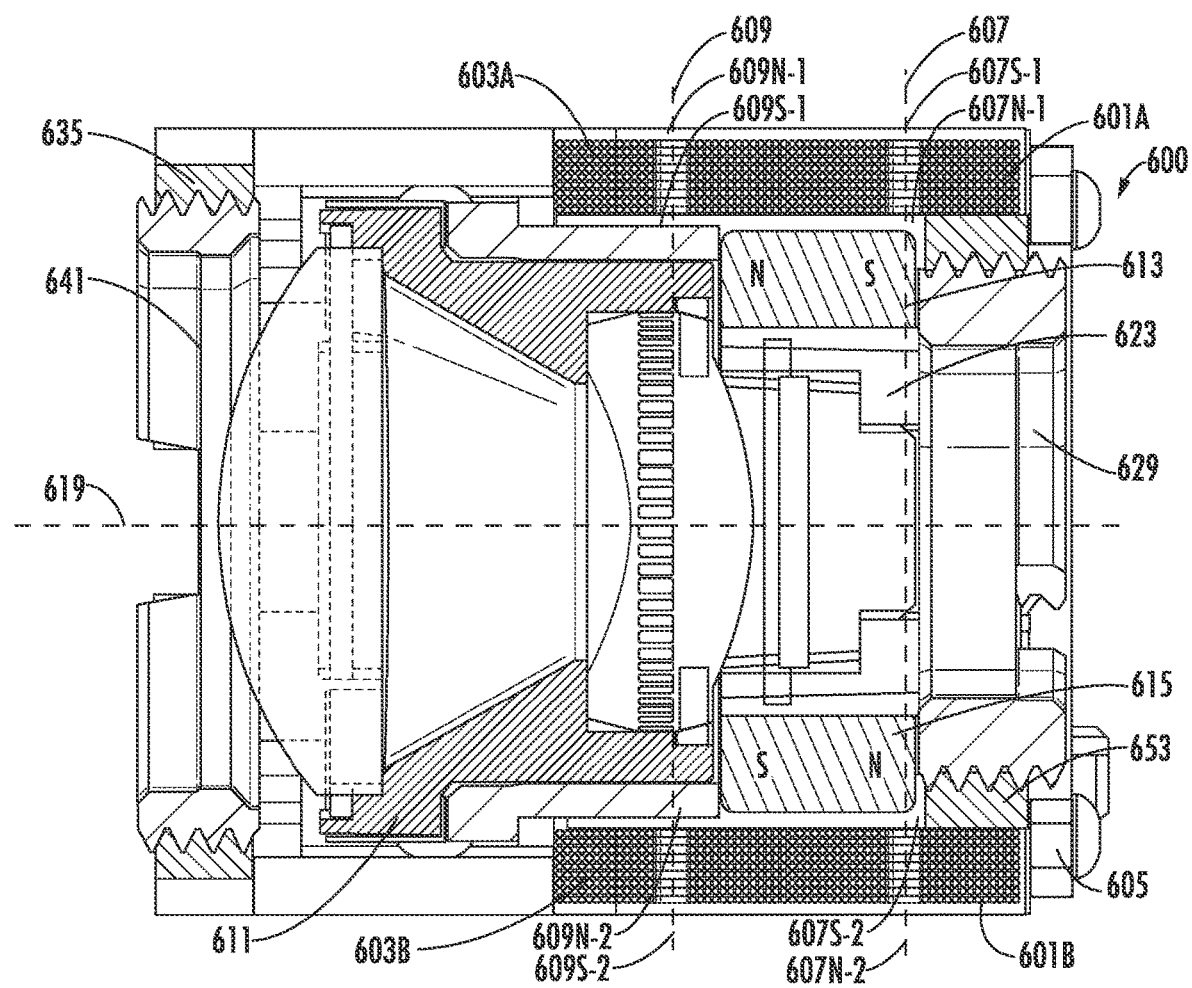
FIG. 6C illustrates another example barrel lens assembly position of an example barrel lens assembly within an example variable focusing lens apparatus in accordance with some embodiments of the present disclosure.

Referring now to FIG. 6A to FIG. 6C, example cross section views of an example variable focusing lens apparatus 600 in accordance with some embodiments of the present disclosure are illustrated. Similar to FIG. 1D described above, the example cross section views shown in FIG. 6A to FIG. 6C illustrate when the example variable focusing lens apparatus is cut from line A-A' and viewed in the direction as shown in FIG. 1B.

As shown in FIG. 6A to FIG. 6C, the example variable focusing lens apparatus 600 comprises a barrel lens assembly 611 that is positioned within the module holder 635. In some embodiments, the barrel lens assembly 611 is moveable to a plurality of barrel lens assembly positions. In some embodiments, the plurality of barrel lens assembly positions correspond to a plurality of current differential ratios associated with the rear coil current and the front coil current.

In particular, FIG. 6A illustrates an example where the barrel lens assembly position of the example barrel lens assembly 611 is between a front-most barrel lens assembly position and a rear-most barrel lens assembly position. FIG. 6B illustrates an example where the example variable focusing lens apparatus 600 is at the front-most barrel lens assembly position. FIG. 6C illustrates an example where the example variable focusing lens apparatus 600 is at the rear-most barrel lens assembly position.

Referring now to FIG. 6A, the example variable focusing lens apparatus 600 comprises a rear pair of coil elements disposed on a front surface of a dual coil board 605, and a front pair of coil elements positioned in front of the rear pair of coil elements, similar to those described above. In particular, the rear pair of coil elements comprises a top rear coil element 601A and a bottom rear coil element 601B, and the front pair of coil elements comprises a top front coil element 603A and a bottom front coil element 603B.

Similar to those described above, the central axis of the top rear coil element 601A and the central axis of the bottom rear coil element 601B may overlap with one another. In such embodiments, the magnetic axis of the magnetic field generated by the top rear coil element 601A and the magnetic axis of the magnetic field generated by the bottom rear coil element 601B may be aligned with one another, such that the rear pair of coil elements (e.g. the top rear coil element 601A and the bottom rear coil element 601B) defines/provides a rear coil magnetic axis 607 that connects the magnetic axis of the magnetic field generated by the top rear coil element 601A and the magnetic axis of the magnetic field generated by the bottom rear coil element 601B.

As described above in connection with FIG. 5, a rear coil variable power circuitry may be electronically coupled to the rear pair of coil elements (e.g. the top rear coil element 601A and the bottom rear coil element 601B) and provides a rear coil current to the rear pair of coil elements (e.g. the top rear coil element 601A and the bottom rear coil element 601B). In some embodiments, the direction of the magnetic fields produced by the top rear coil element 601A and the bottom rear coil element 601B can be determined according to the right hand grip rule.

For example, when viewed from a top of the top rear coil element 601A, the rear coil current in the top rear coil element 601A may flow in a clockwise direction. In such an example, the magnetic field produced by the top rear coil element 601A includes a magnetic South 607S-1 and a magnetic North 607N-1, and the magnetic North 607N-1 is positioned under the magnetic South 607S-1 along the rear coil magnetic axis 607. Similar to those described above, the top magnetic element 613 is positioned under the top rear coil element 601A and in front of the rear coil magnetic axis 607. As such, the magnetic North 607N-1 of the magnetic field is closer to the top magnetic element 613 than the magnetic South 607S-1 of the magnetic field. In some embodiments, the rear side of the top magnetic element 613 may be a magnetic South pole. As such, the magnetic North 607N-1 of the magnetic field generated by the top rear coil element 601A may cause a rear magnetic force to attract the top magnetic element 613 to a rear end of the example variable focusing lens apparatus 600.

Similarly, when viewed from a top of the bottom rear coil element 601B, the rear coil current in the bottom rear coil element 601B may flow in a clockwise direction. In such an example, the magnetic field produced by the bottom rear coil element 601B includes a magnetic South 607S-2 and a magnetic North 607N-2, and the magnetic North 607N-2 is positioned under the magnetic South 607S-2 along the rear coil magnetic axis 607. Similar to those described above, the bottom magnetic element 615 is positioned above the bottom rear coil element 601B and in front of the rear coil magnetic axis 607. As such, the magnetic South 607S-2 of the magnetic field is closer to the bottom magnetic element 615 than the magnetic North 607N-2 of the magnetic field. In some embodiments, the rear side of the bottom magnetic element 615 may be a magnetic North pole. As such, the magnetic South 607S-2 of the magnetic field generated by the bottom rear coil element 601B may cause a rear magnetic force to attract the bottom magnetic element 615 to a rear end of the example variable focusing lens apparatus 600.

In some embodiments, the rear magnetic force from the magnetic field generated by the top rear coil element 601A is proportional to the rear coil current that flows in the top rear coil element 601A, and the rear magnetic force from the magnetic field generated by the bottom rear coil element 601B is proportional to the rear coil current that flows in the bottom rear coil element 601B. In some embodiments, the rear coil current that flows in the top rear coil element 601A is the same as the rear coil current that flows in the bottom rear coil element 601B. As such, the rear magnetic force from the magnetic field generated by the top rear coil element 601A is the same as the rear magnetic force from the magnetic field generated by the bottom rear coil element 601B.

Similar to those described above, the central axis of the top front coil element 603A and the central axis of the bottom front coil element 603B may overlap with one another. In such embodiments, the magnetic axis of the magnetic field generated by the top front coil element 603A and the magnetic axis of the magnetic field generated by the bottom front coil element 603B may be aligned with one another, such that the front pair of coil elements (e.g. the top front coil element 603A and the bottom front coil element 603B) defines/provides a front coil magnetic axis 609 that connects the magnetic axis of the magnetic field generated by the top front coil element 603A and the magnetic axis of the magnetic field generated by the bottom front coil element 603B.

As described above in connection with FIG. 5, a front coil variable power circuitry may be electronically coupled to the front pair of coil elements (e.g. the top front coil element 603A and the bottom front coil element 603B) and provides a front coil current to the front pair of coil elements (e.g. the top front coil element 603A and the bottom front coil element 603B). In some embodiments, the direction of the magnetic fields produced by the top front coil element 603A and the bottom front coil element 603B can be determined according to the right hand grip rule.

For example, when viewed from the top of the top front coil element 603A, the front coil current in the top front coil element 603A may flow in a counter-clockwise direction. In such an example, the magnetic field produced by the top front coil element 603A includes a magnetic South 609S-1 and a magnetic North 609N-1, and the magnetic South 609S-1 is positioned under the magnetic North 609N-1 along the front coil magnetic axis 609. Similar to those described above, the top magnetic element 613 is positioned under the top front coil element 603A and behind the front coil magnetic axis 609. As such, the magnetic South 609S-1 of the magnetic field is closer to the top magnetic element 613 than the magnetic North 609N-1 of the magnetic field. In some embodiments, the front side of the top magnetic element 613 may be a magnetic North pole. As such, the magnetic South 609S-1 of the magnetic field generated by the top front coil element 603A may cause a front magnetic force to attract the top magnetic element 613 to a front side of the example variable focusing lens apparatus 600.

Similarly, when viewed from a top of the bottom front coil element 603B, the front coil current in the bottom front coil element 603B may flow in a counter-clockwise direction. In such an example, the magnetic field produced by the bottom front coil element 603B includes a magnetic South 609S-2 and a magnetic North 609N-2, and the magnetic South 609S-2 is positioned under the magnetic North 609N-2 along the front coil magnetic axis 609. Similar to those described above, the bottom magnetic element 615 is positioned above the bottom front coil element 603B and in front of the front coil magnetic axis 609. As such, the magnetic North 609N-2 of the magnetic field is closer to the bottom magnetic element 615 than the magnetic South 609S-2 of the magnetic field. In some embodiments, the front side of the bottom magnetic element 615 may be a magnetic South pole. As such, the magnetic North 609N-2 of the magnetic field generated by the bottom front coil element 603B may cause a front magnetic force to attract the bottom magnetic element 615 to a front side of the example variable focusing lens apparatus 600.

In some embodiments, the front magnetic force from the magnetic field generated by the top front coil element 603A is proportional to the front coil current that flows in the top front coil element 603A, and the front magnetic force from the magnetic field generated by the bottom front coil element 603B is proportional to the front coil current that flows in the bottom front coil element 603B. In some embodiments, the front coil current that flows in the top front coil element 603A is the same as the front coil current that flows in the bottom front coil element 603B. As such, the front magnetic force from the magnetic field generated by the top front coil element 603A is the same as the front magnetic force from the magnetic field generated by the bottom front coil element 603B.

In accordance with some embodiments of the present disclosure, the barrel lens assembly 611 is moveable to a plurality of barrel lens assembly positions.

For example, to move the barrel lens assembly 611 towards a front of the example variable focusing lens apparatus 600, the front coil current that powers the top front coil element 603A and the bottom front coil element 603B may be increased and/or the rear coil current that powers the top rear coil element 601A and the bottom rear coil element 601B may be decreased, so that the front magnetic force from the magnetic field generated by the top front coil element 603A and from the magnetic field generated by the bottom front coil element 603B is more than the rear magnetic force from the magnetic field generated by the top rear coil element 601A and from the magnetic field generated by the bottom rear coil element 601B. As such, the front magnetic force causes the top magnetic element 613 and the bottom magnetic element 615 to move towards the front end of the example variable focusing lens apparatus 600 (for example, towards a front end of the module holder 635). Because the top magnetic element 613 and the bottom magnetic element 615 are secured to the barrel lens assembly 611, the front magnetic force causes the barrel lens assembly 611 to move towards the front end of the example variable focusing lens apparatus 600 (for example, towards a front end of the module holder 635) as well. As described above, the bearing balls between the barrel lens assembly and the module holder may facilitate the movement of the barrel lens assembly relative to the module holder.

As another example, to move the barrel lens assembly 611 towards a rear end of the example variable focusing lens apparatus 600, the front coil current that powers the top front coil element 603A and the bottom front coil element 603B may be decreased and/or the rear coil current that powers the top rear coil element 601A and the bottom rear coil element 601B may be increased, so that the rear magnetic force from the magnetic field generated by the top rear coil element 601A and from the magnetic field generated by the bottom rear coil element 601B is more than the front magnetic force from the magnetic field generated by the top front coil element 603A and from the magnetic field generated by the bottom front coil element 603B. As such, the rear magnetic force causes the top magnetic element 613 and the bottom magnetic element 615 to move to the rear end of the example variable focusing lens apparatus 600 (for example, towards a rear end of the module holder 635). Because the top magnetic element 613 and the bottom magnetic element 615 are secured to the barrel lens assembly 611, the rear magnetic force causes the barrel lens assembly 611 to move towards the rear end of the example variable focusing lens apparatus 600 (for example, towards a rear end of the module holder 635) as well. As described above, the bearing balls between the barrel lens assembly and the module holder may facilitate the movement of the barrel lens assembly relative to the module holder.

In some embodiments, the plurality of barrel lens assembly positions where the barrel lens assembly 611 can be moved to are along the optical axis 619. As described above, the positions of the top magnetic element 613 and the bottom magnetic element 615 are symmetric with respect to the optical axis 619, the positions of the top rear coil element 601A and the bottom rear coil element 601B are symmetric with respect to the optical axis 619, and the positions of the top front coil element 603A and the bottom front coil element 603B are symmetric with respect to the optical axis 619. In addition, the rear magnetic force from the magnetic field generated by the top rear coil element 601A is the same as the rear magnetic force from the magnetic field generated by the bottom rear coil element 601B, and the front magnetic force from the magnetic field generated by the top front coil element 603A is the same as the front magnetic force from the magnetic field generated by the bottom front coil element 603B. As such, any magnetic force that may attract the top magnetic element 613 upwards (due to the magnetic field generated by the top front coil element 603A and/or the top rear coil element 601A) is canceled out by the magnetic force that may attract the top magnetic element 613 downwards (due to the magnetic field generated by the bottom rear coil element 601B and/or the bottom front coil element 603B). As such, the plurality of barrel lens assembly positions are along the optical axis 619.

As the barrel lens assembly 611 is moveable to a plurality of barrel lens assembly positions along the optical axis 619, different barrel lens assembly positions can provide different distances between the at least one lens element of the barrel lens assembly 611 and the object of which the example variable focusing lens apparatus 600 captures an image. Further, a change of the barrel lens assembly position along the optical axis 619 also causes a change of a focal point location on the optical axis 619 (e.g. the focal point of the barrel lens assembly 611). As such, various embodiments of the present disclosure provide a variable focusing lens apparatus that overcomes various technical challenges and difficulties described above.

In some embodiments, the barrel lens assembly position of the barrel lens assembly 611 can be determined based on the front coil current and the front coil current. For example, the plurality of barrel lens assembly positions correspond to a plurality of current differential ratios associated with the front coil current and the rear coil current. In some embodiments, a current differential ratio associated with the front coil current and the rear coil current may be calculated based on the following algorithm:

$$R=(I\_front-I\_rear)/(I\_front+I\_rear)$$

In the above example algorithm, R is a current differential ratio, I_front is the front coil current, I_rear is the rear coil current. As such, the current differential ratio may be calculated based on dividing the difference between the front coil current and the rear coil current by the sum of the front coil current and the rear coil current.

In some embodiments, each barrel lens assembly position may correspond to a unique current differential ratio. For example, the barrel lens assembly position of the barrel lens assembly may be calculated based on the following algorithm:

$$Z=K*R=K*(I\_front-I\_rear)/(I\_front+I\_rear)$$

In the above example algorithm, Z is the barrel lens assembly position relative to a middle barrel lens assembly position, R is a current differential ratio, K is a constant, I_front is the front coil current, and I_rear is the rear coil current. As such, the barrel lens assembly position may be calculated based on multiplying the current differential ratio with a constant. In some embodiments, if the Z is a positive value, it means that the barrel lens assembly position is in front of the middle barrel lens assembly position. If the Z is a negative value, it means that the barrel lens assembly position is behind the middle barrel lens assembly position.

In some embodiments, the constant K may be calculated based on the following algorithm:

$$K=(C\_coil-L\_magnet)/2$$

In the above example algorithm, C_coil is the center-to-center distance between the rear pair of coil elements and the front pair of coil elements. For example, the C_coil may equal the distance between the rear coil magnetic axis 607 and the front coil magnetic axis 609. L_magnet is the effective separation of the magnet poles of the magnetic element (for example, the effective separation distance between the magnetic North pole of the top magnetic element 613 and the magnetic South pole of the top magnetic element 613, or the effective separation distance between the magnetic North pole of the bottom magnetic element 615 and the magnetic South pole of the bottom magnetic element 615). As such, the constant K may be calculated based on dividing, by 2, the difference between (1) the center-to-center distance of the rear pair of coil elements and the front pair of coil elements and (2) the effective separation of the magnet poles of the magnetic element.

As illustrated in the above algorithms, the barrel lens assembly position of the barrel lens assembly is a function of the drive currents in the front pair of coil elements and the rear pair of coil elements.

In particular, the barrel lens assembly position is not dependent on the absolute current value in any coil element alone. For example, while an increase in the front coil current may cause an increase in the strength of the front magnetic force, if the rear coil current also increases proportionally, the strength of the rear magnetic force increases as well, and the increase in the strength of the rear magnetic force may cancel out the increase in the strength of the front magnetic force so that the barrel lens assembly position may not change. As another example, if there is an increase in the front coil current and no change in the rear coil current, the barrel lens assembly may be moved to the front.

Additionally, the barrel lens assembly position is not dependent on the magnet strength of top magnetic element 613 or the bottom magnetic element 615. For example, an increase the magnet strength of the top magnetic element 613/the bottom magnetic element 615 causes an increase in both the front magnetic force and the rear magnetic force experienced by the top magnetic element 613/the bottom magnetic element 615, and the increase in the front magnetic force may cancel out the increase in the rear magnetic force, similar to the example described above.

In accordance with some embodiments of the present disclosure, the barrel lens assembly position is determined by the current differential ratio, as the transducing constant K is only structural geometry related. In other words, the exact position of the barrel lens assembly can be directly determined based on the rear coil current and the front coil current. Other factors such as, but not limited to, magnetic strength of the magnetic elements, do not affect the barrel lens assembly position.

In some embodiments, the exact barrel lens assembly position may be stable after the barrel lens assembly is assembled and calibrated, details of which are described herein.

Referring back to FIG. 6A, the barrel lens assembly 611 is at a middle barrel lens assembly position that is in the middle of the plurality of barrel lens assembly positions. As shown in FIG. 6A, the distance between the top magnetic element 613/bottom magnetic element 615 to the front coil magnetic axis 609 is the same as the distance between the top magnetic element 613/bottom magnetic element 615 to the rear coil magnetic axis 607. For example, the rear pair of coil elements and the front pair of coil elements may be equally energized (for example, receives the same amount of current), such that the front magnetic force exerted by the front pair of coil elements equals to the rear magnetic force exerted by the rear pair of coil elements.

In some embodiments, the middle barrel lens assembly position corresponds to a position where the focal point of the barrel lens assembly 611 is at the middle point on the optical axis 619 among the different focal points of the barrel lens assembly 611 as the barrel lens assembly 611 moves to different barrel lens assembly positions.

As described above, the barrel lens assembly 611 can move towards the front end of the example variable focusing lens apparatus 600 or towards the rear end of the example variable focusing lens apparatus 600, and the movement of the barrel lens assembly 611 is proportional to the current differential ratio (for example, the positions of the top magnetic element 613 and the bottom magnetic element 615 are proportional to the ratio of front coil current and rear coil current as described above).

In some embodiments, the barrel lens assembly 611 may be associated with a maximum moving range of ±250 um. In such embodiments, the front pair of coil elements and the rear pair of coil elements, along with the top magnetic element 613 and the bottom magnetic element 615, may cause the barrel lens assembly 611 to move to a front-most barrel lens assembly position (e.g. the most front barrel lens assembly position of the barrel lens assembly) that is 250 um from the middle barrel lens assembly position shown in FIG. 6A and towards a front end of the example variable focusing lens apparatus. Similarly, the front pair of coil elements and the rear pair of coil elements, along with the top magnetic element 613 and the bottom magnetic element 615, may cause the barrel lens assembly 611 to move to a rear-most barrel lens assembly position (e.g. the most rear barrel lens assembly position of the barrel lens assembly) that is 250 um from the middle barrel lens assembly position shown in FIG. 6A and towards the rear end of the example variable focusing lens apparatus.

Additionally, or alternatively, the movement range associated with the barrel lens assembly 611 may comprise other values.

FIG. 6B illustrates an example barrel lens assembly position of an example barrel lens assembly 611. In particular, FIG. 6B illustrates the front-most barrel lens assembly position of the example variable focusing lens apparatus 600.

As described above, when the front coil current increases and/or the rear coil current decreases, the front magnetic force may increase over the rear magnetic force, which causes the barrel lens assembly 611 to move towards the front end of the example variable focusing lens apparatus. As the front coil current continues to increase and the barrel lens assembly 611 continues to move towards the front, the front stop nut 641 may define a front-most barrel lens assembly position that is the furthest away position from the middle barrel lens assembly position that the barrel lens assembly 611 can move in the front direction. In some embodiments, the front-most barrel lens assembly position corresponds to a position where the focal point of the barrel lens assembly 611 is at the front most point on the optical axis 619 among the different focal points of the barrel lens assembly 611 corresponding to different barrel lens assembly positions of the barrel lens assembly 611.

In the example shown in FIG. 6B, when the barrel lens assembly 611 is at a front-most barrel lens assembly position, the barrel lens assembly 611 is in contact with the front stop nut 641. As described above, the barrel lens assembly 611 may comprise a lens aperture 621 that defines a front aperture opening where light can travel through, and the front stop nut 641 may comprise a front stop nut central opening. In some embodiments, the central axis of the front stop nut central opening is aligned with the central axis of the front aperture opening, and the diameter of the front stop nut central opening is smaller than the diameter of the front aperture opening. Because the front stop nut 641 is secured to the module holder 635, when the barrel lens assembly 611 becomes in contact with the front stop nut 641, the front stop nut 641 blocks the barrel lens assembly 611 from moving further to the front end of the example variable focusing lens apparatus, and therefore defining a front-most barrel lens assembly position of the barrel lens assembly 611.

FIG. 6C illustrates an example barrel lens assembly position of the example barrel lens assembly 611. In particular, FIG. 6C illustrates the rear-most barrel lens assembly position of the example variable focusing lens apparatus 600.

As described above, when the front coil current decreases and/or the rear coil current increases, the rear magnetic force may increase over the front magnetic force, which causes the barrel lens assembly 611 to move towards the rear end of the example variable focusing lens apparatus. As the rear coil current continues to increase and the barrel lens assembly 611 continues to move towards the rear end, the rear stop nut 629 may define a rear-most barrel lens assembly position that is the furthest away position from the middle barrel lens assembly position that the barrel lens assembly 611 can move in the rear direction. In some embodiments, the rear-most barrel lens assembly position corresponds to a position where the focal point of the barrel lens assembly 611 is at the rear most point on the optical axis 619 among the different focal points corresponding to different barrel lens assembly positions of the barrel lens assembly 611.

In the example shown in FIG. 6C, when the barrel lens assembly 611 is at a rear-most barrel lens assembly position, the barrel lens assembly 611 is in contact with the rear stop nut 629. As described above, the barrel lens assembly 611 may comprise a lens barrel 623 that defines a rear barrel opening, and the rear stop nut 629 may comprise a rear stop nut central opening. In some embodiments, the central axis of the rear stop nut central opening is aligned with the central axis of the rear barrel opening, and the diameter of the rear stop nut central opening is smaller than the diameter of the rear barrel opening. Because the rear stop nut 629 is secured to the holder cover 653, when the barrel lens assembly 611 becomes in contact with the rear stop nut 629, the rear stop nut 629 blocks the barrel lens assembly 611 from moving further to the rear end, and therefore defining a rear-most barrel lens assembly position of the barrel lens assembly 611.

Figure 7A:
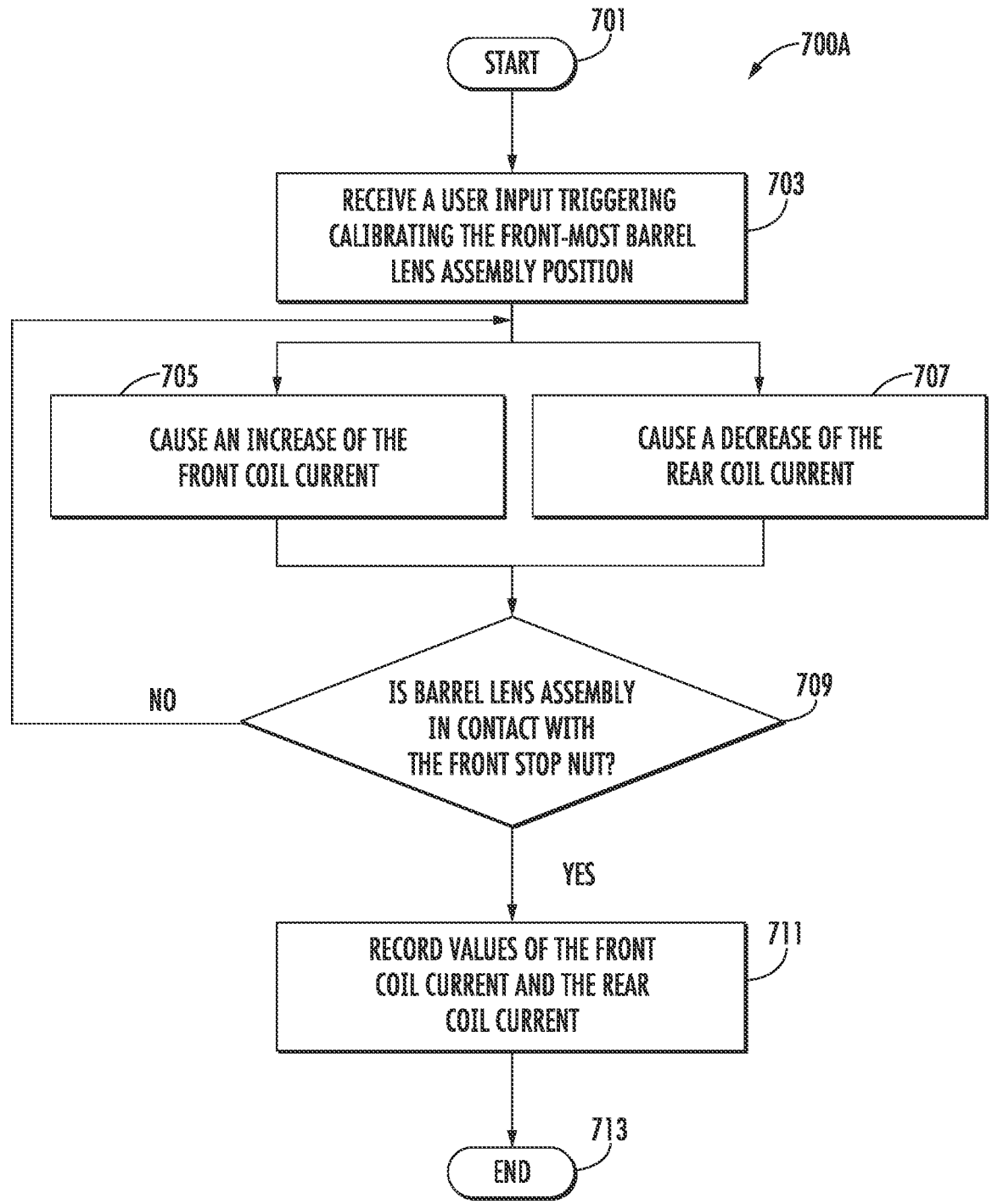
FIG. 7A and FIG. 7B illustrate example methods of calibrating barrel lens assembly positions of an example barrel lens assembly within an example variable focusing lens apparatus in accordance with some embodiments of the present disclosure.
Figure 7B:
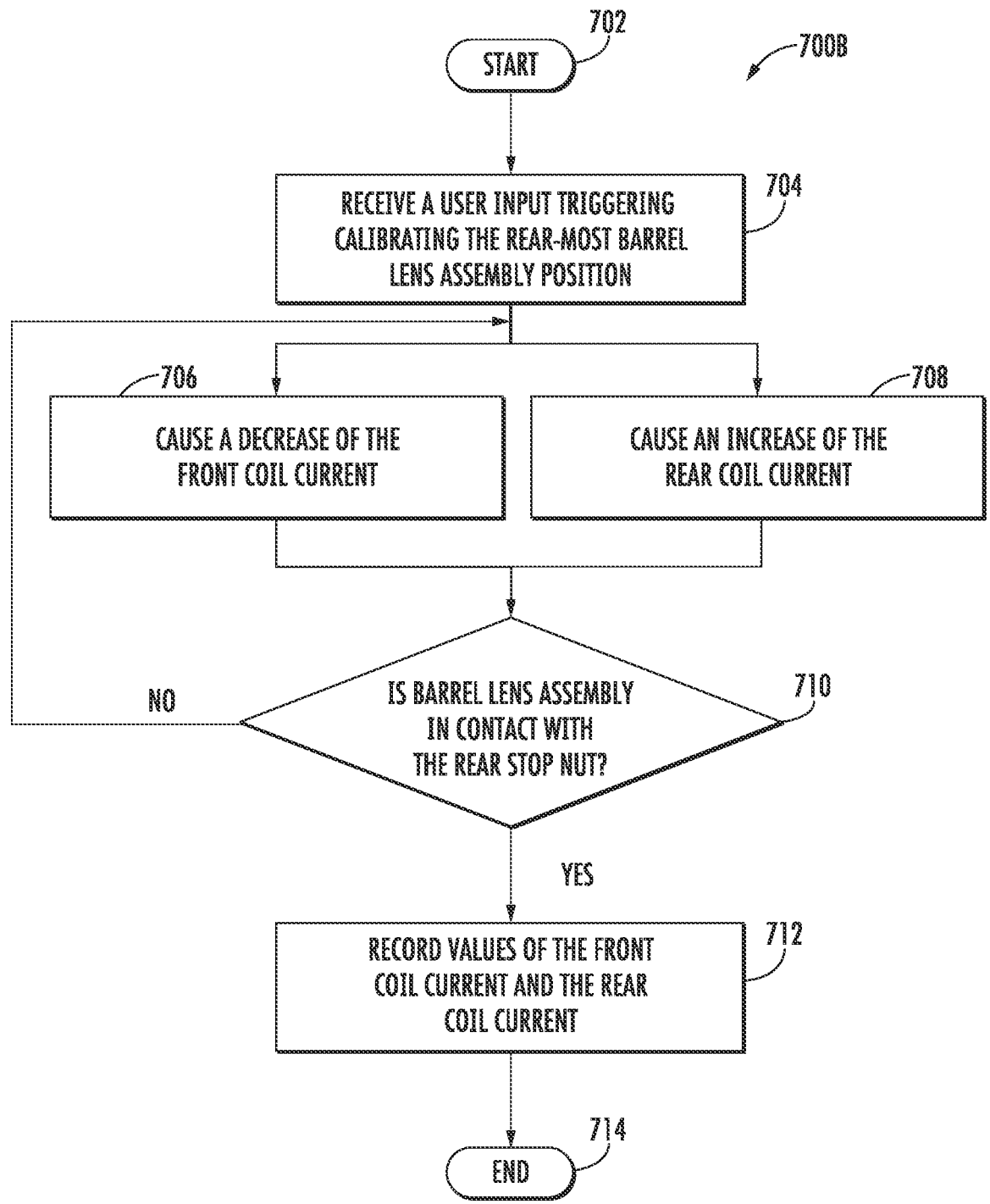
Figure 8:
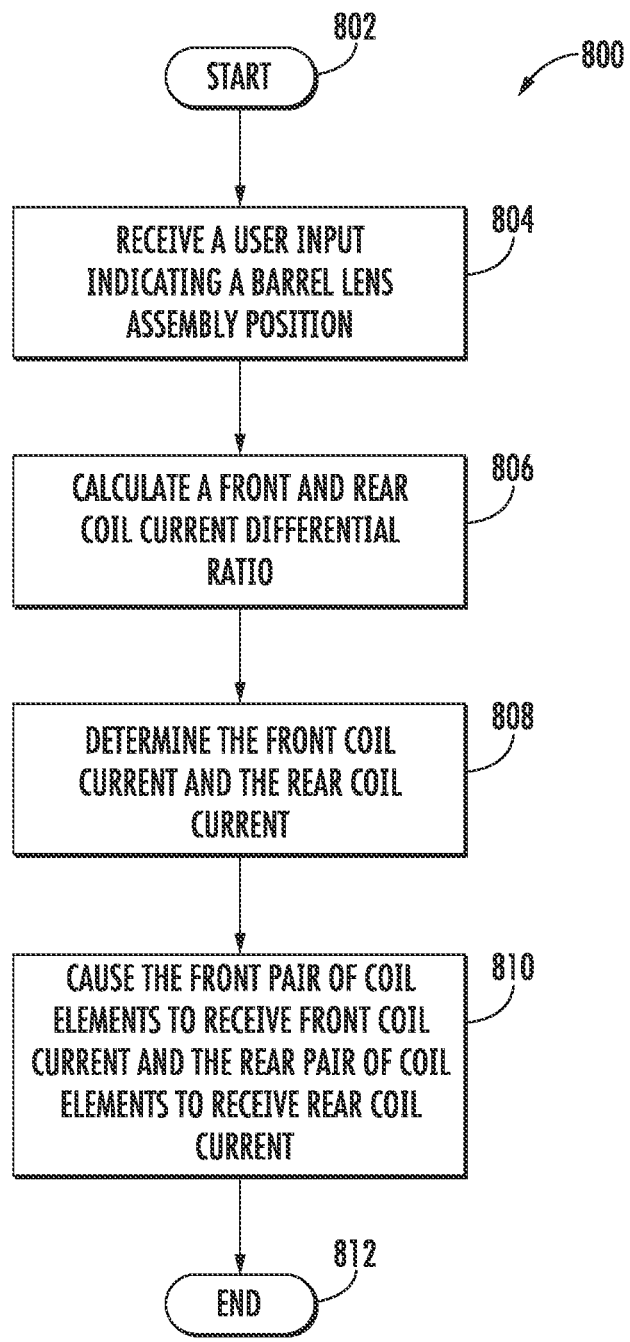
FIG. 8 illustrates an example method of setting an example barrel lens assembly position of an example barrel lens assembly within an example variable focusing lens apparatus in accordance with some embodiments of the present disclosure.

Referring now to FIG. 7A, FIG. 7B, and FIG. 8, example methods for operating an example variable focusing lens apparatus are provided. It is noted that each block of the flowchart, and combinations of blocks in the flowchart, may be implemented by various means such as hardware, firmware, circuitry and/or other devices associated with execution of software including one or more computer program instructions. For example, one or more of the procedures described in FIG. 7A, FIG. 7B, and/or FIG. 8 may be embodied by computer program instructions, which may be stored by a non-transitory memory of an apparatus employing an embodiment of the present disclosure and executed by a processor in the apparatus. These computer program instructions may direct a computer or other programmable apparatus to function in a particular manner, such that the instructions stored in the computer-readable storage memory produce an article of manufacture, the execution of which implements the function specified in the flowchart block(s).

As described above and as will be appreciated based on this disclosure, embodiments of the present disclosure may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Similarly, embodiments may take the form of a computer program code stored on at least one non-transitory computer-readable storage medium. Any suitable computer-readable storage medium may be utilized including non-transitory hard disks, CD-ROMs, flash memory, optical storage devices, or magnetic storage devices.

FIG. 7A illustrates an example method 700A of calibrating barrel lens assembly positions of an example barrel lens assembly within an example variable focusing lens apparatus in accordance with some embodiments of the present disclosure. In particular, FIG. 7A illustrates an example of calibrating the front-most barrel lens assembly position of the example variable focusing lens apparatus.

Referring now to FIG. 7A, the example method 700A starts at step/operation 701. Subsequent to and/or in response to step/operation 701, the example method 700A proceeds to step/operation 703. At step/operation 703, a processing circuitry (for example but not limited to, the processing circuitry 501 of the example variable focusing lens apparatus 500 described above in connection with FIG. 5) may receive a user input triggering calibrating the front-most barrel lens assembly position.

For example, the user may provide user input through the input/output circuitry 507 of the example variable focusing lens apparatus 500 described above in connection with FIG. 5. In some embodiments, the user input may indicate a request from the user to trigger calibrating the front-most barrel lens assembly position of the barrel lens assembly.

As described above, an example variable focusing lens apparatus in accordance with some embodiments of the present disclosure may define a front-most barrel lens assembly position, which corresponds to the most front position of the barrel lens assembly in the example variable focusing lens apparatus. As described above, when barrel lens assembly is at the front-most barrel lens assembly position, the front stop nut may prevent the barrel lens assembly from moving further to the front.

In some embodiments, a user may request calibrating the front-most barrel lens assembly position of the barrel lens assembly so as to determine the distance between the front-most barrel lens assembly position and the middle barrel lens assembly position. Through calibration, the processing circuitry may determine a current differential ratio associated with the rear coil current and the front coil current when the barrel lens assembly is at the front-most barrel lens assembly position.

Referring back to FIG. 7A, subsequent to and/or in response to step/operation 703, the example method 700A proceeds to step/operation 705. At step/operation 705, a processing circuitry (for example but not limited to, the processing circuitry 501 of the example variable focusing lens apparatus 500 described above in connection with FIG. 5) may cause an increase of the front coil current.

To calibrate the front-most barrel lens assembly position, the processing circuitry may cause the barrel lens assembly to be moved to the front of the example variable focusing lens apparatus until the barrel lens assembly is in contact with the front stop nut. For example, the front pair of coil elements may generate magnetic fields that exert a front magnetic force to attract the top magnetic element of the barrel lens assembly and the bottom magnetic element of the barrel lens assembly to the front. In some embodiments, the higher the front coil current, the stronger the front magnetic force.

As described above in connection with at least FIG. 5, the processing circuitry may be electronically coupled to the front coil variable power circuitry, and the front coil variable power circuitry may provide the front coil current to the front pair of coil elements. In some embodiments, the processing circuitry may transmit control instructions to the front coil variable power circuitry, and the control instructions may comprise an increased value of the front coil current. In some embodiments, in response to receiving the control instructions, the front coil variable power circuitry may increase the front coil current to the front pair of coil elements based on the increased value of the front coil current.

Referring back to FIG. 7A, subsequent to and/or in response to step/operation 703, the example method 700A proceeds to step/operation 707 in addition to or in alternative of step/operation 705. At step/operation 707, a processing circuitry (for example but not limited to, the processing circuitry 501 of the example variable focusing lens apparatus 500 described above in connection with FIG. 5) may cause a decrease of the rear coil current.

As described above, the rear pair of coil elements may generate magnetic fields that exert a rear magnetic force to attract the top magnetic element of the barrel lens assembly and the bottom magnetic element of the barrel lens assembly to the rear end of the example variable focusing lens apparatus. In some embodiments, the lower the rear coil current, the weaker the rear magnetic force. As such, to cause the barrel lens assembly to be moved to the front end of the example variable focusing lens apparatus, the rear coil current can be decreased.

As described above in connection with at least FIG. 5, the processing circuitry may be electronically coupled to the rear coil variable power circuitry, and the rear coil variable power circuitry may provide the rear coil current to the rear pair of coil elements. In some embodiments, the processing circuitry may transmit control instructions to the rear coil variable power circuitry, and the control instructions may comprise a decreased value of the rear coil current. In some embodiments, in response to receiving the control instructions, the rear coil variable power circuitry may decrease the rear coil current to the rear pair of coil elements based on the decreased value of the rear coil current.

In some embodiments, the example method 700A may perform one of step/operation 705 or step/operation 707. In some embodiments, the example method 700A may perform both step/operation 705 and step/operation 707.

Referring back to FIG. 7A, subsequent to and/or in response to step/operation 705 and/or step/operation 707, the example method 700A proceeds to step/operation 709. At step/operation 709, a processing circuitry (for example but not limited to, the processing circuitry 501 of the example variable focusing lens apparatus 500 described above in connection with FIG. 5) may determine whether the barrel lens assembly is in contact with the front stop nut.

As described above, when the barrel lens assembly is in contact with the front stop nut, the barrel lens assembly is at the front-most barrel lens assembly position. In some embodiments, the processing circuitry may determine whether the barrel lens assembly is in contact with the front stop nut through a variety of different ways.

For example, as described above, a change of the barrel lens assembly position may cause a change in the focal point location, which in turn can cause a change in the image data captured by the imaging sensor. When the barrel lens assembly is at the front-most barrel lens assembly position, the barrel lens assembly cannot be moved any further to the front even if there is an increase of the front coil current at step/operation 705 and/or a decrease of the rear coil current at step/operation 707. As such, the processing circuitry may determine whether the barrel lens assembly is in contact with the front stop nut based on whether there is a change in the image data captured by the imaging sensor subsequent to an increase of the front coil current at step/operation 705 and/or a decrease of the rear coil current at step/operation 707. If there is no change, the processing circuitry determines that the barrel lens assembly is in contact with the front stop nut (i.e., the barrel lens assembly is at the front-most barrel lens assembly position). If there is a change, the processing circuitry determines that the barrel lens assembly is not in contact with the front stop nut (i.e., the barrel lens assembly is not at the front-most barrel lens assembly position).

If, at step/operation 709, the processing circuitry determines that the barrel lens assembly is not in contact with the front stop nut, the example method 700A returns to step/operation 705 and/or step/operation 707.

For example, the processing circuitry may continue causing an increase of the front coil current and/or causing a decrease of the rear coil current, until the barrel lens assembly is in contact with the front stop nut (i.e., until the barrel lens assembly is at the front-most barrel lens assembly position).

If, at step/operation 709, the processing circuitry determines that the barrel lens assembly is in contact with the front stop nut, the example method 700A proceeds to step/operation 711. At step/operation 711, a processing circuitry (for example but not limited to, the processing circuitry 501 of the example variable focusing lens apparatus 500 described above in connection with FIG. 5) may record values of the front coil current and the rear coil current.

For example, the processing circuitry may record the value of the front coil current based on the increase of the front coil current described above in connection with step/operation 705, and/or may record the value of the rear coil current based on the decrease of the rear coil current described above in connection with step/operation 707.

In some embodiments, the processing circuitry may calculate the current differential ratio associated with the front coil current and the rear coil current when the barrel lens assembly is at the front-most barrel lens assembly position based on the following algorithm:

$$R = (I\_front - I\_rear)/(I\_front + I\_rear)$$

In the above example algorithm, R is a current differential ratio, I_front is the front coil current, I_rear is the rear coil current.

In some embodiments, the processing circuitry may calculate the front-most barrel lens assembly position based on the following algorithm:

$$Z = K*R = K*(I\_front - I\_rear)/(I\_front + I\_rear)$$

In the above example algorithm, Z is the front-most barrel lens assembly position relative to a middle barrel lens assembly position, R is the current differential ratio, K is a constant, I_front is the front coil current, and I_rear is the rear coil current. In some embodiments, K may be calculated based on the example algorithms described herein.

In some embodiments, subsequent to calculating the current differential ratio R and/or the front-most barrel lens assembly position Z, the processing circuitry may store the current differential ratio R and/or the front-most barrel lens assembly position Z in a data storage media. In some embodiments, the processing circuitry may associate the values of R and/or Z with an indication that they correspond to the front-most barrel lens assembly position.

Referring back to FIG. 7A, subsequent to and/or in response to step/operation 711, the example method 700A proceeds to step/operation 713 and ends.

FIG. 7B illustrates an example method 700B of calibrating barrel lens assembly positions of an example barrel lens assembly within an example variable focusing lens apparatus in accordance with some embodiments of the present disclosure. In particular, FIG. 7B illustrates an example of calibrating the rear-most barrel lens assembly position of the example variable focusing lens apparatus.

Referring now to FIG. 7B, the example method 700B starts at step/operation 702. Subsequent to and/or in response to step/operation 702, the example method 700B proceeds to step/operation 704. At step/operation 704, a processing circuitry (for example but not limited to, the processing circuitry 501 of the example variable focusing lens apparatus 500 described above in connection with FIG. 5) may receive a user input triggering calibrating the rear-most barrel lens assembly position.

For example, the user may provide user input through the input/output circuitry 507 of the example variable focusing lens apparatus 500 described above in connection with FIG. 5. In some embodiments, the user input may indicate a request from the user to trigger calibrating the rear-most barrel lens assembly position of the barrel lens assembly.

As described above, an example variable focusing lens apparatus in accordance with some embodiments of the present disclosure may define a rear-most barrel lens assembly position, which corresponds to the most rear position of the barrel lens assembly in the example variable focusing lens apparatus. For example, when the barrel lens assembly is at the rear-most barrel lens assembly position, the rear stop nut may prevent the barrel lens assembly from moving further to the rear end of the example variable focusing lens apparatus.

In some embodiments, a user may request calibrating the rear-most barrel lens assembly position of the barrel lens assembly so as to determine the distance between the rear-most barrel lens assembly position and the middle barrel lens assembly position. Through calibration, the processing circuitry may determine a current differential ratio associated with the rear coil current and the front coil current when the barrel lens assembly is at the rear-most barrel lens assembly position.

Referring back to FIG. 7B, subsequent to and/or in response to step/operation 704, the example method 700B proceeds to step/operation 706. At step/operation 706, a processing circuitry (for example but not limited to, the processing circuitry 501 of the example variable focusing lens apparatus 500 described above in connection with FIG. 5) may cause a decrease of the front coil current.

To calibrate the rear-most barrel lens assembly position, the processing circuitry may cause the barrel lens assembly to be moved towards the rear end of the example variable focusing lens apparatus until the barrel lens assembly is in contact with the rear stop nut. However, the front pair of coil elements may generate magnetic fields that exert a front magnetic force to attract the top magnetic element of the barrel lens assembly and the bottom magnetic element of the barrel lens assembly to the front. In some embodiments, the lower the front coil current, the weaker the front magnetic force.

As described above in connection with at least FIG. 5, the processing circuitry may be electronically coupled to the front coil variable power circuitry, and the front coil variable power circuitry may provide the front coil current to the front pair of coil elements. In some embodiments, the processing circuitry may transmit control instructions to the front coil variable power circuitry, and the control instructions may comprise a decreased value of the front coil current. In some embodiments, in response to receiving the control instructions, the front coil variable power circuitry may decrease the front coil current to the front pair of coil elements based on the decreased value of the front coil current.

Referring back to FIG. 7B, subsequent to and/or in response to step/operation 704, the example method 700B proceeds to step/operation 708 in addition to or in alternative of step/operation 706. At step/operation 708, a processing circuitry (for example but not limited to, the processing circuitry 501 of the example variable focusing lens apparatus 500 described above in connection with FIG. 5) may cause an increase of the rear coil current.

As described above, the rear pair of coil elements may generate magnetic fields that exert a rear magnetic force to attract the top magnetic element of the barrel lens assembly and the bottom magnetic element of the barrel lens assembly to the rear end of the example variable focusing lens apparatus. In some embodiments, the higher the rear coil current, the stronger the rear magnetic force. As such, to cause the barrel lens assembly to be moved towards the rear end of the example variable focusing lens apparatus, the rear coil current may be increased.

As described above in connection with at least FIG. 5, the processing circuitry may be electronically coupled to the rear coil variable power circuitry, and the rear coil variable power circuitry may provide the rear coil current to the rear pair of coil elements. In some embodiments, the processing circuitry may transmit control instructions to the rear coil variable power circuitry, and the control instructions may comprise an increased value of the rear coil current. In some embodiments, in response to receiving the control instructions, the rear coil variable power circuitry may increase the rear coil current to the rear pair of coil elements based on the increased value of the rear coil current.

In some embodiments, the example method 700B may perform one of step/operation 706 or step/operation 708. In some embodiments, the example method 700B may perform both step/operation 706 and step/operation 708.

Referring back to FIG. 7B, subsequent to and/or in response to step/operation 706 and/or step/operation 708, the example method 700B proceeds to step/operation 710. At step/operation 710, a processing circuitry (for example but not limited to, the processing circuitry 501 of the example variable focusing lens apparatus 500 described above in connection with FIG. 5) may determine whether the barrel lens assembly is in contact with the rear stop nut.

As described above, when the barrel lens assembly is in contact with the rear stop nut, the barrel lens assembly is at the rear-most barrel lens assembly position. In some embodiments, the processing circuitry may determine whether the barrel lens assembly is in contact with the rear stop nut through a variety of different ways.

For example, as described above, a change of the barrel lens assembly position may cause a change in the focal point location, which in turn can cause a change in the image data captured by the imaging sensor. However, when the barrel lens assembly is at the rear-most barrel lens assembly position, the barrel lens assembly cannot be moved any further to the rear end even if there is a decrease of the front coil current at step/operation 706 and/or an increase of the rear coil current at step/operation 708. As such, the processing circuitry may determine whether the barrel lens assembly is in contact with the rear stop nut based on whether there is a change in the image data captured by the imaging sensor subsequent to a decrease of the front coil current at step/operation 706 and/or an increase of the rear coil current at step/operation 708. If there is no change, the processing circuitry determines that the barrel lens assembly is in contact with the rear stop nut (i.e. the barrel lens assembly is at the rear-most barrel lens assembly position). If there is a change, the processing circuitry determines that the barrel lens assembly is not in contact with the rear stop nut (i.e. the barrel lens assembly is not at the rear-most barrel lens assembly position)

If, at step/operation 710, the processing circuitry determines that the barrel lens assembly is not in contact with the rear stop nut, the example method 700B returns to step/operation 706 and/or step/operation 708.

For example, the processing circuitry may continue causing a decrease of the front coil current and/or causing an increase of the rear coil current, until the barrel lens assembly is in contact with the rear stop nut (i.e., the barrel lens assembly is at the rear-most barrel lens assembly position).

If, at step/operation 710, the processing circuitry determines that the barrel lens assembly is in contact with the rear stop nut, the example method 700B proceeds to step/operation 712. At step/operation 712, a processing circuitry (for example but not limited to, the processing circuitry 501 of the example variable focusing lens apparatus 500 described above in connection with FIG. 5) may record values of the front coil current and the rear coil current.

For example, the processing circuitry may record the value of the front coil current based on the decrease of the front coil current described above in connection with step/operation 706, and/or may record the value of the rear coil current based on the increase of the rear coil current described above in connection with step/operation 708.

In some embodiments, the processing circuitry may calculate the current differential ratio associated with the front coil current and the rear coil current when the barrel lens assembly is at the rear-most barrel lens assembly position based on the following algorithm:

$$R=(I\_front-I\_rear)/(I\_front+I\_rear)$$

In the above example algorithm, R is a current differential ratio, I_front is the front coil current, I_rear is the rear coil current.

In some embodiments, the processing circuitry may calculate the rear-most barrel lens assembly position based on the following algorithm:

$$Z=K*R=K*(I\_front-I\_rear)/(I\_front+I\_rear)$$

In the above example algorithm, Z is the rear-most barrel lens assembly position relative to a middle barrel lens assembly position, R is the current differential ratio, K is a constant, I_front is the front coil current, and I_rear is the rear coil current. In some embodiments, K may be calculated based on the example algorithms described herein.

In some embodiments, subsequent to calculating the current differential ratio R and/or the rear-most barrel lens assembly position Z, the processing circuitry may store the current differential ratio R and/or the rear-most barrel lens assembly position Z in a data storage media. In some embodiments, the processing circuitry may associate the values of R and/or Z with an indication that they correspond to the rear-most barrel lens assembly position.

Referring back to FIG. 7B, subsequent to and/or in response to step/operation 712, the example method 700B proceeds to step/operation 714 and ends.

In some embodiments, based on the example method 700A described above in connection with FIG. 7A and the example method 700B described above in connection with FIG. 7B, the processing circuitry may determine a movement range of the barrel lens assembly. For example, the processing circuitry may calculate a first distance Z1 between the front-most barrel lens assembly position and the middle barrel lens assembly position based on the example method 700A, and calculate a second distance Z2 between the rear-most barrel lens assembly position and the middle barrel lens assembly position based on the example method 700B. In some embodiments, the processing circuitry may calculate the movement range by adding the first distance Z1 and the second distance Z2.

In some embodiments, the processing circuitry may set predefined barrel lens assembly positions based on the movement range. For example, to set a total of n predefined barrel lens assembly positions, the processing circuitry may divide the movement range by n to determine a position difference m between the predefined barrel lens assembly positions. The processing circuitry may set the first predefined barrel lens assembly position based on the rear-most barrel lens assembly position, set the second predefined barrel lens assembly position based on the rear-most barrel lens assembly position plus m, and so on. As described above, in barcode scanning application, the processing circuitry may set five predefined barrel lens assembly positions that can cover (1) ultra-high density codes in very close range, (2) high density codes in close range, (3) normal density codes in middle range, (4) low density codes in extended range, and (5) big codes in extra-far range.

FIG. 8 illustrates an example method 800 of setting an example barrel lens assembly position of an example barrel lens assembly within an example variable focusing lens apparatus in accordance with some embodiments of the present disclosure.

In the example shown in FIG. 8, the example method 800 starts at step/operation 802. Subsequent to and/or in response to step/operation 802, the example method 800 proceeds to step/operation 804. At step/operation 804, a processing circuitry (for example but not limited to, the processing circuitry 501 of the example variable focusing lens apparatus 500 described above in connection with FIG. 5) may receive a user input indicating a barrel lens assembly position.

For example, the user may provide user input through the input/output circuitry 507 of the example variable focusing lens apparatus 500 described above in connection with FIG. 5. In some embodiments, the user input may indicate a request to move the barrel lens assembly to a particular barrel lens assembly position. For example, the user input may indicate a request to move the barrel lens assembly to a barrel lens assembly position that is relative to the middle barrel lens assembly position.

While the description above provides an example of receiving a user input indicating the barrel lens assembly position, it is noted that the scope of the present disclosure is not limited to the description above. In some examples, an example method may receive an indication of a barrel lens assembly position from another processing circuitry (for example, from a processing circuitry associated with the imaging sensor). In such an example, the other processing circuitry may determine a suitable barrel lens assembly position for the barrel lens assembly, and may request the barrel lens assembly to be moved to the suitable barrel lens assembly position.

Referring back to FIG. 8, subsequent to and/or in response to step/operation 804, the example method 800 proceeds to step/operation 806. At step/operation 806, a processing circuitry (for example but not limited to, the processing circuitry 501 of the example variable focusing lens apparatus 500 described above in connection with FIG. 5) may calculate a front and rear coil current differential ratio.

For example, the processing circuitry may determine the front and rear coil current differential ratio based on the following algorithm:

$$R=Z/K$$

In the above example algorithm, Z is the barrel lens assembly position received at step/operation 804 relative to a middle barrel lens assembly position, R is the front and rear coil current differential ratio, and K is a constant. In some embodiments, K may be calculated based on the example algorithms described herein.

Referring back to FIG. 8, subsequent to and/or in response to step/operation 806, the example method 800 proceeds to step/operation 808. At step/operation 808, a processing circuitry (for example but not limited to, the processing circuitry 501 of the example variable focusing lens apparatus 500 described above in connection with FIG. 5) may determine the front coil current and the rear coil current.

In some embodiments, the processing circuitry may determine the front coil current and the rear coil current based on the following algorithm:

$$R=(I\_front-I\_rear)/(I\_front+I\_rear)$$

In the above example algorithm, R is the current differential ratio calculated at step/operation 806, I_front is the front coil current, and I_rear is the rear coil current.

In some embodiments, the processing circuitry may set the value of the front coil current at a predetermined value, and may then calculate the value of the rear coil current based on the above example algorithm. Additionally, or alternatively, the processing circuitry may set the value of the rear coil current at a predetermined value, and may then calculate the value of the front coil current based on the above example algorithm.

Referring back to FIG. 8, subsequent to and/or in response to step/operation 808, the example method 800 proceeds to step/operation 810. At step/operation 810, a processing circuitry (for example but not limited to, the processing circuitry 501 of the example variable focusing lens apparatus 500 described above in connection with FIG. 5) may cause the front pair of coil elements to receive front coil current and the rear pair of coil elements to receive rear coil current.

As described above in connection with at least FIG. 5, the processing circuitry may be electronically coupled to the front coil variable power circuitry, and the front coil variable power circuitry may provide the front coil current to the front pair of coil elements. In some embodiments, the processing circuitry may transmit control instructions to the front coil variable power circuitry, and the control instructions may comprise the value of the front coil current calculated at step/operation 808. In some embodiments, in response to receiving the control instructions, the front coil variable power circuitry may apply the front coil current to the front pair of coil elements so that the front pair of coil elements receive the front coil current corresponding to the front coil current calculated at step/operation 808.

Similarly, the processing circuitry may be electronically coupled to the rear coil variable power circuitry, and the rear coil variable power circuitry may provide the rear coil current to the rear pair of coil elements. In some embodiments, the processing circuitry may transmit control instructions to the rear coil variable power circuitry, and the control instructions may comprise the value of the rear coil current calculated at step/operation 808. In some embodiments, in response to receiving the control instructions, the rear coil variable power circuitry may apply the rear coil current to the rear pair of coil elements so that the rear pair of coil elements receive the rear coil current corresponding to the rear coil current calculated at step/operation 808.

Accordingly, by setting the front coil current that flows in the front pair of coil elements and the rear coil current that flows in the rear pair of coil elements, various embodiments of the present disclosure may directly set the position of the barrel lens assembly. As such, various embodiments of the present disclosure provide an open-loop, one-stop action for setting the positions of the barrel lens assembly that can reduce the response time with reliable positioning accuracy for the industry scanning applications.

Referring back to FIG. 8, subsequent to and/or in response to step/operation 810, the example method 800 proceeds to step/operation 812 and ends.

While the description above provides an example of determining the front coil current and the rear coil current based on the barrel lens assembly position, it is noted that the scope of the present disclosure is not limited to the description above. In some examples, an example method may include determining the barrel lens assembly position based on the front coil current and the rear coil current. For example, a processing circuitry (for example but not limited to, the processing circuitry 501 of the example variable focusing lens apparatus 500 described above in connection with FIG. 5) may receive the values of the front coil current and the rear coil current (for example, based on signals from the front coil variable power circuitry and the rear coil variable power circuitry), and may determine a barrel lens assembly position based on the following algorithm:

$$Z = K^* (I\_front - I\_rear) / (I\_front + I\_rear)$$

In the above example algorithm, Z is the barrel lens assembly position relative to a middle barrel lens assembly position, K is a constant, I_front is the front coil current, and I_rear is the rear coil current. In some embodiments, K may be calculated based on the example algorithms described herein.

The examples above illustrate various technical improvements and benefits provided by some embodiments of the present disclosure. Because of the high margin of the drive current, other factors (such as friction, gravity and other changes) may have a very low impact on the positions of the barrel lens assembly, if any. As such, various embodiments of the present disclosure provide a proportional lens actuator that can reliably provide the position of the barrel lens assembly based on drive current ratio, and the margin of the drive current level can minimize any residual position variations.

It is to be understood that the disclosure is not to be limited to the specific embodiments disclosed, and that modifications and other embodiments are intended to be included within the scope of the appended claims. Although specific terms are employed herein, they are used in a generic and descriptive sense only and not for purposes of limitation, unless described otherwise.

The invention claimed is:

1. A variable focusing lens apparatus comprising:
a rear pair of coil elements powered by a rear coil current;
a front pair of coil elements positioned in front of the rear pair of coil elements and powered by a front coil current; and
a barrel lens assembly comprising a top magnetic element secured on a top portion of the barrel lens assembly and a bottom magnetic element secured on a bottom portion of the barrel lens assembly, wherein the barrel lens assembly is moveable to a plurality of barrel lens assembly positions along an optical axis between an extreme near focusing position and an extreme far focusing position, wherein the plurality of barrel lens assembly positions is determined based on a current differential ratio and a predetermined constant, wherein the current differential ratio is determined based on the rear coil current in the rear pair of coil elements and the front coil current in the front pair of coil elements.

2. The variable focusing lens apparatus of claim 1, further comprising:
a rear coil variable power circuitry electronically coupled to the rear pair of coil elements and provides the rear coil current to the rear pair of coil elements; and
a front coil variable power circuitry electronically coupled to the front pair of coil elements and provides the front coil current to the front pair of coil elements.

3. The variable focusing lens apparatus of claim 1, wherein the rear pair of coil elements define a rear coil magnetic axis, wherein the front pair of coil elements define a front coil magnetic axis, wherein the top magnetic element and the bottom magnetic element are positioned between the front coil magnetic axis and the rear coil magnetic axis.

4. The variable focusing lens apparatus of claim 3, wherein at least one lens element is secured within the barrel lens assembly, wherein the at least one lens element defines the optical axis, wherein the plurality of barrel lens assembly positions are along the optical axis.

5. The variable focusing lens apparatus of claim 1, wherein the plurality of barrel lens assembly positions (Z) is determined based on $Z=K*(I\_front-I\_rear)/(I\_front+I\_rear)$, wherein K represents the predetermined constant, wherein $(I\_front-I\_rear)/(I\_front+I\_rear)$ represents the current differential ratio.

6. The variable focusing lens apparatus of claim 1, wherein the barrel lens assembly comprises a lens barrel and a lens aperture, wherein the lens aperture is positioned within the lens barrel, wherein the top magnetic element and the bottom magnetic element are secured to the barrel lens assembly.

7. The variable focusing lens apparatus of claim 1, wherein the rear pair of coil elements comprises a top rear coil element and a bottom rear coil element, wherein the front pair of coil elements comprises a top front coil element and a bottom front coil element.

8. The variable focusing lens apparatus of claim 7, wherein the top rear coil element is connected to a dual coil board at a top end of a front surface of the dual coil board, wherein the bottom rear coil element is connected to the dual coil board at a bottom end of the front surface of the dual coil board.

9. The variable focusing lens apparatus of claim 7, wherein the top front coil element is positioned in front of the top rear coil element, wherein the bottom front coil element is positioned in front of the bottom rear coil element.

10. The variable focusing lens apparatus of claim 7, further comprising:
a holder cover positioned between the top rear coil element and the bottom rear coil element.

11. The variable focusing lens apparatus of claim 10, wherein the holder cover defines a holder cover central opening and comprises a plurality of holder cover threads disposed on an inner periphery surface of the holder cover.

12. The variable focusing lens apparatus of claim 11, further comprising:
a rear stop nut defining a rear stop nut central opening and comprising a plurality of rear stop nut threads disposed on an outer periphery surface of the rear stop nut, wherein the plurality of rear stop nut threads of the rear stop nut engages with the plurality of holder cover threads of the holder cover.

13. The variable focusing lens apparatus of claim 12, wherein, when the barrel lens assembly is at a rear-most barrel lens assembly position, the barrel lens assembly is in contact with the rear stop nut.

14. The variable focusing lens apparatus of claim 1, further comprising:
a module holder, wherein the barrel lens assembly is at least partially positioned within the module holder.

15. The variable focusing lens apparatus of claim 14, wherein the module holder defines a module holder central opening and comprises a plurality of module holder threads disposed on an inner periphery surface of the module holder.

16. The variable focusing lens apparatus of claim 15, further comprising:
a front stop nut defining a front stop nut central opening and comprising a plurality of front stop nut threads disposed on an outer periphery surface of the front stop nut, wherein the plurality of front stop nut threads engages with the plurality of module holder threads of the module holder.

17. The variable focusing lens apparatus of claim 16, wherein, when the barrel lens assembly is at a front-most barrel lens assembly position, the barrel lens assembly is in contact with the front stop nut.

18. The variable focusing lens apparatus of claim 14, wherein the rear pair of coil elements and the front pair of coil elements are positioned between the module holder and a dual coil board.

19. The variable focusing lens apparatus of claim 14, wherein the barrel lens assembly comprises at least one bearing ball holding portion disposed on an outer surface of the barrel lens assembly, wherein at least one bearing ball is positioned on the at least one bearing ball holding portion.

20. The variable focusing lens apparatus of claim 19, wherein the module holder comprises at least one bearing ball moving rail disposed on an inner surface of the module holder, wherein the at least one bearing ball is moveable along the at least one bearing ball moving rail.

* * * * *